(12) United States Patent
Huang et al.

(10) Patent No.: US 12,477,113 B2
(45) Date of Patent: Nov. 18, 2025

(54) COEFFICIENT CODING/DECODING METHOD, ENCODER, DECODER, AND COMPUTER STORAGE MEDIUM

(71) Applicant: GUANGDONG OPPO MOBILE TELECOMMUNICATIONS CORP., LTD., Dongguan (CN)

(72) Inventors: Hang Huang, Dongguan (CN); Fan Wang, Dongguan (CN); Zhihuang Xie, Dongguan (CN); Qichao Yuan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/243,874

(22) Filed: Sep. 8, 2023

(65) Prior Publication Data

US 2023/0421766 A1   Dec. 28, 2023

Related U.S. Application Data

(63) Continuation of application No. PCT/CN2021/087499, filed on Apr. 15, 2021.

(30) Foreign Application Priority Data

Mar. 17, 2021   (CN) .................... 202110287204.8

(51) Int. Cl.
*H04N 19/13* (2014.01)
*H04N 19/124* (2014.01)
(Continued)

(52) U.S. Cl.
CPC .......... *H04N 19/13* (2014.11); *H04N 19/124* (2014.11); *H04N 19/129* (2014.11); *H04N 19/176* (2014.11)

(58) Field of Classification Search
CPC .... H04N 19/176; H04N 19/13; H04N 19/124; H04N 19/129
See application file for complete search history.

(56) References Cited

U.S. PATENT DOCUMENTS

| 9,743,111 B2 | 8/2017 | Kim |
| 9,749,656 B2 | 8/2017 | Kim |

(Continued)

FOREIGN PATENT DOCUMENTS

| CN | 1719903 A | 1/2006 |
| CN | 1741616 A | 3/2006 |

(Continued)

OTHER PUBLICATIONS

International Search Report in the international application No. PCT/CN2021/087499, mailed on Dec. 22, 2021. 5 pages with English translation.

(Continued)

*Primary Examiner* — Zhubing Ren
(74) *Attorney, Agent, or Firm* — BAYES PLLC

(57) ABSTRACT

Provided are a coefficient coding/decoding method, an encoder and a decoder. The method includes: parsing a bitstream by adaptive binary arithmetic coding using a first context model based on quantization coefficient positions to be decoded to obtain a value of a non-zero identification; if the value is a first value, parsing the bitstream by adaptive binary aritlunetic coding using a second context model to obtain values of X preset identifications; if the value of the X-th preset identification is the first value, determining a target order of exponential Golomb coding, and parsing the bitstream using an exponential Golomb decoding algorithm of the target order to obtain remaining values of reconstructed quantization coefficient absolute values; and determining reconstructed quantization coefficient absolute values corresponding to the quantization coefficient positions (Continued)

based on the value of non-zero identification, values of X preset identifications, and remaining values of reconstructed quantization coefficient absolute values.

20 Claims, 5 Drawing Sheets

(51) Int. Cl.
*H04N 19/129* (2014.01)
*H04N 19/176* (2014.01)

(56) References Cited

U.S. PATENT DOCUMENTS

| | | | |
|---|---|---|---|
| 10,412,416 | B2 | 9/2019 | Kim |
| 10,448,019 | B2 | 10/2019 | He |
| 10,582,218 | B2 | 3/2020 | Kim |
| 10,645,389 | B2 | 5/2020 | He |
| 10,735,736 | B2 | 8/2020 | He |
| 10,887,595 | B2 | 1/2021 | He |
| 11,039,169 | B2 | 6/2021 | Kim |
| 2015/0110198 | A1* | 4/2015 | Kim ............... H04N 19/60 375/240.18 |
| 2016/0205412 | A1 | 7/2016 | Kim |
| 2017/0064336 | A1* | 3/2017 | Zhang ............ H04N 19/122 |
| 2017/0332102 | A1 | 11/2017 | Kim |
| 2019/0068970 | A1 | 2/2019 | He |
| 2019/0068994 | A1 | 2/2019 | He |
| 2019/0349603 | A1 | 11/2019 | Kim |
| 2019/0394467 | A1 | 12/2019 | He |
| 2020/0077117 | A1* | 3/2020 | Karczewicz ....... H04N 19/13 |
| 2020/0228804 | A1 | 7/2020 | He |
| 2020/0267412 | A1* | 8/2020 | Karczewicz ....... H04N 19/70 |
| 2020/0280741 | A1 | 9/2020 | Kim |
| 2020/0404332 | A1* | 12/2020 | Sarwer ............ H04N 19/91 |
| 2021/0120249 | A1 | 4/2021 | He |
| 2021/0168370 | A1* | 6/2021 | Yoo ................ H04N 19/136 |

FOREIGN PATENT DOCUMENTS

| | | |
|---|---|---|
| CN | 102186087 A | 9/2011 |
| CN | 103636224 A | 3/2014 |
| CN | 108134942 A | 6/2018 |

OTHER PUBLICATIONS

Written Opinion of the International Search Authority in the international application No. PCT/CN2021/087499, mailed on Dec. 22, 2021. 8 pages with English translation.

Schwarz (Fraunhofer) H et al: "CE7: Transform coefficient coding with reduced number of regular-coded bins (tests 7.1.3a, 7.1.3b)", 12. JVET Meeting; Oct. 3, 2018-Oct. 12, 2018; MACAO; (The Joint Video Exploration Team of ISO/IEC JTC1/SC29/WG11 and ITU-T SG. 16), No. JVET-L0274-v3, Oct. 3, 2018 (Oct. 3, 2018), XP030194467, the whole document.

Schwarz (Fraunhofer) H et al: "CE7: Transform coefficient coding with reduced number of regular-coded bins (tests 7.1.3a, 7.1.3b)", 12. JVET Meeting; Oct. 3, 2018-Oct. 12, 2018; MACAO; (The Joint Video Exploration Team of ISO/IEC JTC1/SC29/WG11 and ITU-T SG. 16 No. JVET-L0274-Draft Text For VVC-version A, Oct. 3, 2018 (Oct. 3, 2018), XP030194469, the whole document.

Supplementary European Search Report in the European application No. 21930982.0, mailed on Jan. 31, 2025. 9 pages.

First Office Action of the Chinese application No. 202411882794.9, issued on Sep. 28, 2025.

Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0072-v2, Title: Non-CE7: Alternative Entropy Coding for Dependent Quantization, Status: Input document to JVET, Purpose: Proposal, Author(s) or Contact(s): Heiko Schwarz, Tung Nguyen, Detlev Marpe, Thomas Wiegand.

\* cited by examiner

COEFFICIENT CODING/DECODING METHOD, ENCODER, DECODER, AND COMPUTER STORAGE MEDIUM

CROSS-REFERENCE TO RELATED APPLICATIONS

This application is a continuation application of International Patent Application No. PCT/CN2021/087499 filed on Apr. 15, 2021, which claims the benefit of priority to Chinese Patent Application No. 202110287204.8, entitled "METHOD FOR CODING AND DECODING COEFFICIENT, ENCODER, DECODER, AND COMPUTER STORAGE MEDIUM", filed on Mar. 17, 2021, both of which are incorporated herein by reference in their entireties.

TECHNICAL FIELD

The disclosure relates to the field of video coding and decoding, and particularly to a method for coding and decoding a coefficient, an encoder, a decoder, and a computer storage medium.

BACKGROUND

Computer vision has acquired growing attention with an increased requirement on quality of video display. Recently, picture processing technology has applied successfully to all walks of life. In video picture codec, at an encoder side, after picture data to be coded have been transformed and quantized, compression coding is performed by an entropy coding unit on the picture data. A bitstream generated by entropy coding is to be transmitted to a decoder. Then, the bitstream is decoded, and the picture data originally input may be recovered by performing inverse quantization and inverse transform on the bitstream.

In related art, to further compress data, an encoder may transform residual data in a pixel domain onto a transform domain, thereby acquiring transform coefficients. The transform coefficients may be quantized in a coefficient scan order through a two-dimensional (2D) array to generate one-dimensional quantized coefficients, to implement more compression. However, a lot of statistical characteristics may exist between quantized coefficients at respective locations on a scan line. Existing monotonous coding modes do not make the most of these statistical characteristics, leading to poor coding performance.

SUMMARY

Embodiments of the disclosure provide a method for coding and decoding a coefficient, an encoder, a decoder, and a computer storage medium, capable of saving a bit rate, improving performance of coding and/or decoding.

In a first aspect, embodiments of the disclosure provide a method for decoding a coefficient, implemented by a decoder. The method includes:
  acquiring a value of a significant identification by decoding a bitstream through adaptive binary arithmetic coding using a first context model based on a quantized coefficient location to be decoded;
  in response to the value of the significant identification being a first value, acquiring values of X preset identifications by decoding the bitstream through adaptive binary arithmetic coding using a second context model, X being a natural number greater than zero;
  in response to a value of an X-th preset identification being the first value, determining a target order of exponential-Golomb coding, and acquiring a remainder of a reconstructed quantized coefficient absolute value by decoding the bitstream through exponential-Golomb decoding of the target order, the target order being an integer greater than zero; and
  determining the reconstructed quantized coefficient absolute value corresponding to the quantized coefficient location based on the value of the significant identification, the values of the X preset identifications, and the remainder of the reconstructed quantized coefficient absolute value.

In a second aspect, embodiments of the disclosure provide a method for coding a coefficient, implemented by an encoder. The method includes:
  determining a quantized coefficient to be coded;
  determining a value of a significant identification based on the quantized coefficient, and performing entropy coding on the value of the significant identification through adaptive binary arithmetic coding using a first context model;
  in response to the value of the significant identification being a first value, determining values of X preset identifications based on the quantized coefficient, and performing entropy coding on the values of the X preset identifications in turn through adaptive binary arithmetic coding using a second context model, X being a natural number greater than zero;
  in response to a value of an X-th preset identification being the first value, determining a remainder of an absolute value of the quantized coefficient and a target order of exponential-Golomb coding, and performing entropy coding on the remainder of the absolute value of the quantized coefficient through exponential-Golomb coding of the target order; and
  writing bit information acquired through coding into a bitstream.

In a third aspect, embodiments of the disclosure provide an encoder, including a first determining unit, an entropy coding unit, and a writing unit.

The first determining unit is configured to determine a quantized coefficient to be coded.

The entropy coding unit is configured to determine a value of a significant identification based on the quantized coefficient, and perform entropy coding on the value of the significant identification through adaptive binary arithmetic coding using a first context model; in response to the value of the significant identification being a first value, determine values of X preset identifications based on the quantized coefficient, and perform entropy coding on the values of the X preset identifications in turn through adaptive binary arithmetic coding using a second context model, X being a natural number greater than zero.

The entropy coding unit is configured to, in response to a value of an X-th preset identification being the first value, determine a remainder of an absolute value of the quantized coefficient and a target order of exponential-Golomb coding, and perform entropy coding on the remainder of the absolute value of the quantized coefficient through exponential-Golomb coding of the target order.

The writing unit is configured to write bit information acquired through coding into a bitstream.

In a fourth aspect, embodiments of the disclosure provide an encoder including a first memory and a first processor.

The first memory is configured to store thereon a computer program executable on the first processor.

The first processor is configured to implement the method of the second aspect when executing the computer program.

In a fifth aspect, embodiments of the disclosure provide a decoder including a decoding unit and a second determining unit.

The decoding unit is configured to acquire a value of a significant identification by decoding a bitstream through adaptive binary arithmetic coding using a first context model based on a quantized coefficient location to be decoded.

The decoding unit is configured to, in response to the value of the significant identification being a first value, acquire values of X preset identifications by decoding the bitstream through adaptive binary arithmetic coding using a second context model, X being a natural number greater than zero; and in response to a value of an X-th preset identification being the first value, determine a target order of exponential-Golomb coding, and acquire a remainder of a reconstructed quantized coefficient absolute value by decoding the bitstream through exponential-Golomb decoding of the target order. The target order is an integer greater than zero.

The second determining unit is configured to determine the reconstructed quantized coefficient absolute value corresponding to the quantized coefficient location based on the value of the significant identification, the values of the X preset identifications, and the remainder of the reconstructed quantized coefficient absolute value.

In a sixth aspect, embodiments of the disclosure provide a decoder. The decoder includes a second memory and a second processor.

The second memory is configured to store thereon a computer program executable on the second processor.

The second processor is configured to implement the method of the first aspect when executing the computer program.

In a seventh aspect, embodiments of the disclosure provide a computer storage medium. The computer storage medium has stored thereon a computer program. When executed, the computer program implements the method of the first aspect, or implements the method of the second aspect.

With the methods for coding and decoding a coefficient, the encoder, the decoder, and the computer storage medium according to embodiments of the disclosure, at the encoder side, a quantized coefficient to be coded is determined first. Then, a value of a significant identification is determined based on the quantized coefficient. Entropy coding is performed on the value of the significant identification through adaptive binary arithmetic coding using a first context model. In case the value of the significant identification is a first value, values of X preset identifications are determined based on the quantized coefficient. Entropy coding is performed on the values of the X preset identifications in turn through adaptive binary arithmetic coding using a second context model. X is a natural number greater than zero. In case a value of an X-th preset identification is the first value, a remainder of an absolute value of the quantized coefficient and a target order of exponential-Golomb coding are determined. Entropy coding is performed on the remainder of the absolute value of the quantized coefficient through exponential-Golomb coding of the target order. Finally, bit information acquired through coding is written into a bitstream. At the decoder side, first, a value of a significant identification is acquired by decoding a bitstream through adaptive binary arithmetic coding using a first context model based on a quantized coefficient location to be decoded. Then, in case the value of the significant identification is a first value, values of X preset identifications are acquired by decoding the bitstream through adaptive binary arithmetic coding using a second context model. X is a natural number greater than zero. In case a value of an X-th preset identification is the first value, a target order of exponential-Golomb coding is determined. A remainder of a reconstructed quantized coefficient absolute value is acquired by decoding the bitstream through exponential-Golomb decoding of the target order. The target order is an integer greater than zero. Finally, the reconstructed quantized coefficient absolute value corresponding to the quantized coefficient location is determined based on the value of the significant identification, the values of the X preset identifications, and the remainder of the reconstructed quantized coefficient absolute value. Thus, by making the most of the statistical characteristics of the quantized coefficients at respective locations, in addition to performing entropy coding on a newly introduced preset identification through a context model, a coding mode is adjusted for a remainder of an absolute value of a quantized coefficient, making better use of characteristics of adaptive coding during coding and/or decoding, thereby saving a bit rate and improving performance of coding and/or decoding.

DETAILED DESCRIPTION

Figure 1:
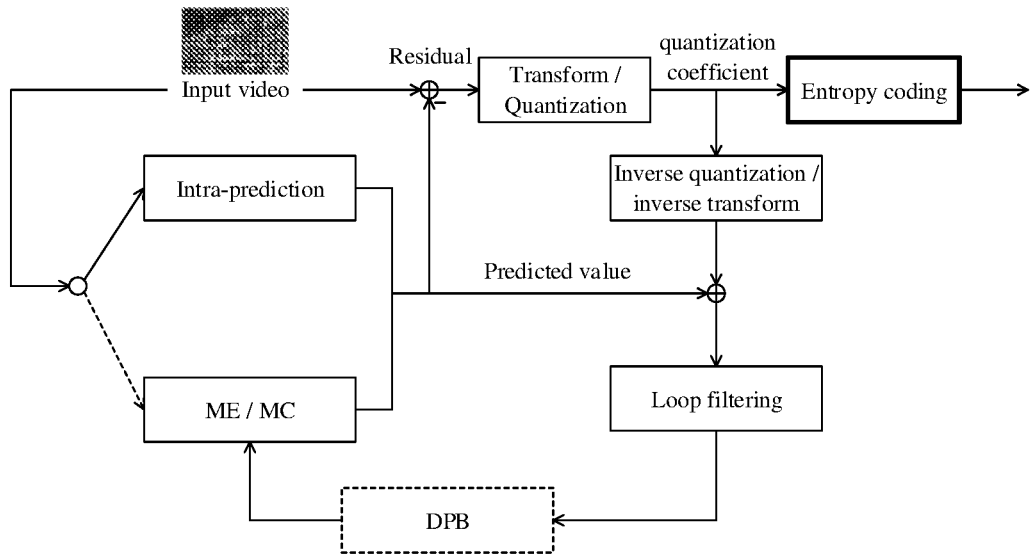
FIG. 1 is an application diagram of a coding framework in related art.

Embodiments of the disclosure are elaborated below with reference to the drawings to allow a more thorough understanding of features and technical contents of embodiments here. The drawings herein are just for reference and explanation, and are not intended to limit embodiments of the disclosure.

Unless otherwise defined, all technical and scientific terms used herein have the same meanings as commonly understood by a person having ordinary skill in the art of the disclosure. Terms used in the specification of the disclosure are merely for the purpose of describing specific embodiments, and are not intended to limit the disclosure.

In the following description, "some embodiment(s)" describe a subset of all possible embodiments. However, understandably, "some embodiment(s)" may be the same subset of all possible embodiments or different subsets of all possible embodiments, and may be combined with each other as long as no conflict results from the combination. Also note that in embodiments of the disclosure, a term "first\second\third" is just for differentiating similar objects, and does not denote any specific order of the objects. Understandably, when allowed, "first\second\third" in a specific order is interchangeable, to allow embodiments of the disclosure described here to be implemented in an order other than one illustrated or described here.

In a video picture, a coding block (CB) is denoted generally by a first picture component, a second picture component, and a third picture component. The three picture components may be a luma component, a blue chroma component, and a red chroma component, respectively. Specifically, the luma component is denoted in general by Y. The blue chroma component may be denoted in general by Cb or U. The red chroma component may be denoted in general by Cr or V. Thus, the video picture may be expressed in a YCbCr format or a YUV format.

Before embodiments of the disclosure is elaborated further, described and explained are names and terms involved in embodiments of the disclosure, as follows:
moving picture experts group (MPEG),
international standardization organization (ISO),
international electrotechnical commission (IEC),
joint video experts team (JVET),
alliance for open media (AOM),
next generation video coding standard H.266/versatile video coding (VVC),
VVC reference software test platform (VVC test model, VTM),
audio video coding standard (audio video standard, AVS),
AVS high-performance test model (high-performance model, HPM),
transform coefficients,
quantization parameter,
context-based adaptive variable-length code (CAVLC),
context-based adaptive binary arithmetic coding (CABAC), and
scan region based coefficient coding (SRCC).

Understandably, digital video compression mainly involves compressing a huge amount of digital image video data to facilitate transmission and storage, etc. With a soaring number of internet videos and an increasingly high requirement on video clarity, although a lot of video data may be saved with an existing digital video compression standard, better digital video compression is yet to be achieved to reduce burden on a bandwidth and a traffic of digital video transmission.

Video compression may include (time-domain) inter-prediction and/or (space-domain) intra-prediction configured to reduce or remove intrinsic redundancy in a video. Transform/quantization and inverse quantization/inverse transform of residual information may improve operations such as loop filtering and entropy coding, etc., of quality of subjective reconstruction and objective reconstruction, specifically as shown in FIG. 1. A mainstream video compression standard basically describes block-based compression. A video slice, a picture, or a series of pictures may be partitioned into basic units of coding tree units (CTU), and based thereon, further partitioned into blocks in unit of coding units (CU). An intra-block may be predicted by referring to a peripheral pixel of the intra-block. An inter-block may be predicted by referring to information on a spatially adjacent block and reference information in another frame. Contrasting signal prediction, a bitstream may be generated after transform/quantization and entropy coding in units of blocks have been performed on the residual information. These technologies are described in standards and implemented in various fields related to video compression. An international mainstream standard may include H.264/advanced video coding (AVC), H.265/high efficiency video coding (HEVC), H.266/versatile video coding (VVC), as well as an expansion of a standard listed here, etc. By implementing these technologies, a video device may achieve more efficient video coding and decoding, transmission, and storage.

A predicted block of a block to be interpreted may be acquired through space or time prediction. Residual data may denote a difference between a value of a pixel in the original block to be interpreted and a value of the pixel in the predicted block. To further compress data, residual data in a pixel domain may be transformed onto a transformed domain, thereby acquiring residual transform coefficients. A one-dimensional vector of quantized coefficients may be produced by quantizing the transform coefficients in a 2D array layout according to a coefficient scan order. Entropy coding may be applied to the coefficients to implement more compression. A block to be interpreted may refer to a block to be coded or a block to be decoded.

Specifically, an encoder (side) may include a transform unit and a quantization unit. First, a matrix of transform coefficients (also referred to as a transform block) may be acquired by transforming a block to be interpreted such as predicted residuals (which may be denoted by residuals) using the transform unit. Then, the matrix of transform coefficients may be quantized using the quantization unit. Final quantized coefficients may be written into a video bitstream.

A decoder (side) may include an inverse quantization unit and an inverse transform unit. First, quantized coefficients corresponding to the matrix of transform coefficients may be acquired by decoding the bitstream. Reconstructed values of the matrix of transform coefficients may be acquired by performing inverse quantization (also referred to as scaling) on the quantized coefficients using the inverse quantization unit, thus acquiring a matrix of coefficients. Then, a reconstructed block of residuals may be acquired finally by performing inverse transform corresponding to the transform unit of the encoder on the matrix of coefficients using the inverse transform unit.

In related art, in quantization, a better quantization mode may be selected using characteristics of the quantized coefficients using an inter-coefficient correlation, thereby optimizing quantization. To facilitate forming a video bit rate, a 2D coefficient block may be transformed into a one-dimensional coefficient stream in a specific order. The order of scan may be a zigzag order of scan, a horizontal order of scan, a vertical order of scan, or any other order of scan. In most existing video coding standards, a non-binary quantized coefficient is to be further binarized to acquire a bit (bins). A final bitstream may be generated by performing model-based binary arithmetic coding on a binary (or binarized) quantized coefficient. However, as a lot of statistical characteristics may exist between quantized coefficients at respective locations on a scan line, with an existing monotonous coding mode, adaptive binary arithmetic coding based on a context model does not make the most of these statistical characteristics, leading to poor coding performance.

Embodiments of the disclosure provide a method for coding a coefficient, implemented by an encoder. A quantized coefficient to be coded is determined. A value of a significant identification is determined based on the quantized coefficient. Entropy coding is performed on the value of the significant identification through adaptive binary arithmetic coding using a first context model. In case the value of the significant identification is a first value, values of X preset identifications are determined based on the quantized coefficient. Entropy coding is performed on the values of the X preset identifications in turn through adaptive binary arithmetic coding using a second context model. X is a natural number greater than zero. In case a value of an X-th preset identification is the first value, a remainder of an absolute value of the quantized coefficient and a target order of exponential-Golomb coding are determined. Entropy coding is performed on the remainder of the absolute value of the quantized coefficient through exponential-Golomb coding of the target order. Bit information acquired through coding is written into a bitstream.

Embodiments of the disclosure further provide a method for decoding a coefficient, implemented by a decoder. A value of a significant identification is acquired by decoding a bitstream through adaptive binary arithmetic coding using a first context model based on a quantized coefficient location to be decoded. In case the value of the significant identification is a first value, values of X preset identifications are acquired by decoding the bitstream through adaptive binary arithmetic coding using a second context model. X is a natural number greater than zero. In case a value of an X-th preset identification is the first value, a target order of exponential-Golomb coding is determined. A remainder of a reconstructed quantized coefficient absolute value is acquired by decoding the bitstream through exponential-Golomb decoding of the target order. The target order is an integer greater than zero. The reconstructed quantized coefficient absolute value corresponding to the quantized coefficient location is determined based on the value of the significant identification, the values of the X preset identifications, and the remainder of the reconstructed quantized coefficient absolute value.

Thus, by making the most of the statistical characteristics of the quantized coefficients at the respective locations, in addition to performing entropy coding on a newly introduced preset identification through a context model, a mode of coding a remainder of an absolute value of a quantized coefficient is adjusted, making better use of characteristics of adaptive coding during coding and/or decoding, thereby saving a bit rate, improving performance of coding and/or decoding.

Embodiments of the disclosure are elaborated below with reference to the drawings.

Figure 2:
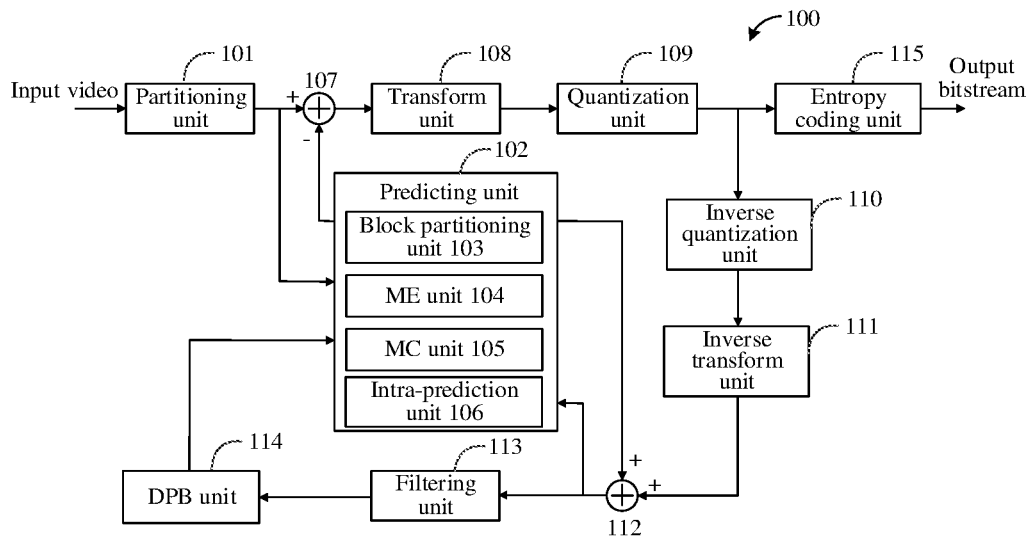
FIG. 2 is a diagram of system composition of an encoder according to embodiments of the disclosure.

FIG. 2 is a block diagram of system composed of an encoder according to embodiments of the disclosure. As shown in FIG. 2, an encoder 100 may include a partitioning unit 101, a predicting unit 102, a first adder 107, a transform unit 108, a quantization unit 109, an inverse quantization unit 110, an inverse transform unit 111, a second adder 112, a filtering unit 113, a decoded picture buffer (DPB) unit 114, and an entropy coding unit 115. An input of the encoder 100 may be a video composed of a series of pictures or a static picture. An output of the encoder 100 may be a stream of bits (also referred to as a bitstream) configured to denote a compressed version of the input video.

The partitioning unit 101 may partition a picture in the input video into one or more CTUs (coding tree units). The partitioning unit 101 may divide the picture into multiple picture blocks (also referred to as tiles), and may further divide a tile into one or more bricks. A tile or a brick may include one or more complete and/or partial CTUs. In addition, the partitioning unit 101 may form one or more slices. A slice may include one or more tiles in the picture arranged in a raster order, or one or more tiles covering a rectangular region in the picture. The partitioning unit 101 may also form one or more sub-pictures. A sub-picture may include one or more slices, tiles, or bricks.

In coding by the encoder 100, the partitioning unit 101 may transmit a CTU to the predicting unit 102. In general, the predicting unit 102 may be composed of a block partitioning unit 103, a motion estimation (ME) unit 104, a motion compensation (MC) unit 105, and an intra-prediction unit 106. Specifically, the block partitioning unit 103 further partitions the input CTU into smaller Cus (coding units) by iteratively using quad-tree partition, binary tree partition, and ternary tree partition. The predicting unit 102 may acquire an inter-predicted block of a CU using the ME unit 104 and the MC unit 105. The intra-prediction unit 106 may acquire an intra-predicted block of a CU using various intra-prediction modes including a model predictive control (MIP) mode. In an example, a mode of ME in rate distortion optimization (RDO) may be called by the ME unit 104 and the MC unit 105 to acquire an inter-predicted block. A way of determining a mode in RDO may be called by the intra-prediction unit 106 to acquire an intra-predicted block.

The predicting unit 102 may output a predicted block of a CU. The first adder 107 may compute differences between a CU in the output of the partitioning unit 101 and a predicted block of the CU, i.e., residual CUs. The transform unit 108 may read the residual CUs and perform one or more transform operations on the residual CUs to acquire coefficients. The quantization unit 109 may quantize the coefficients and output the quantized coefficients (i.e., levels). The inverse quantization unit 110 may scale the quantized coefficients to output reconstructed coefficients. The inverse transform unit 111 may perform one or more inverse transforms corresponding to the transform in the transform unit 108 and output reconstructed residuals. The second adder 112 may compute reconstructed CUs by adding the reconstructed residuals and the predicted block of the CU from the predicting unit 102. The second adder 112 may further send an output of the second adder to the predicting unit 102 as a reference for intra-prediction. After each CU in a picture or sub-picture has been reconstructed, the filtering unit 113 may perform loop filtering on the reconstructed picture or sub-picture. The filtering unit 113 may include one or more filters such as a deblocking filter, a sample adaptive offset (SAO) filter, an adaptive loop filter (ALF), a luma mapping with chroma scaling (LMCS) filter, and a filter based on a neural network, etc. Alternatively, when the filtering unit 113 determines that a CU is not used as a reference for coding another CU, the filtering unit 113 may perform loop filtering on one or more target pixels in the CU.

An output of the filtering unit 113 may be a decoded picture or sub-picture. The decoded picture or sub-picture may be cached in the DPB unit 114. The DPB unit 114 may output the decoded picture or sub-picture based on timing and control information. A picture stored in the DPB unit 114 may further be used as a reference for inter-prediction or intra-prediction performed by the predicting unit 102. Finally, the entropy coding unit 115 may convert a parameter (such as a control parameter, supplementary information, etc.) from the encoder 100 necessary for decoding a picture into a binary form, and write the binary form in the bitstream based on a syntax structure of each data unit. That is, the encoder 100 outputs a final bitstream.

Further, the encoder 100 may have a first processor and a first memory recording a computer program. When the first processor reads and runs the computer program, the encoder 100 reads an input video and generates a bitstream corresponding to the input video. In addition, the encoder 100 may further be a computing device having one or more chips. A unit implemented as an integrated circuit on a chip may have a connection and a data exchange function similar to those of a corresponding unit in FIG. 2.

Figure 3:
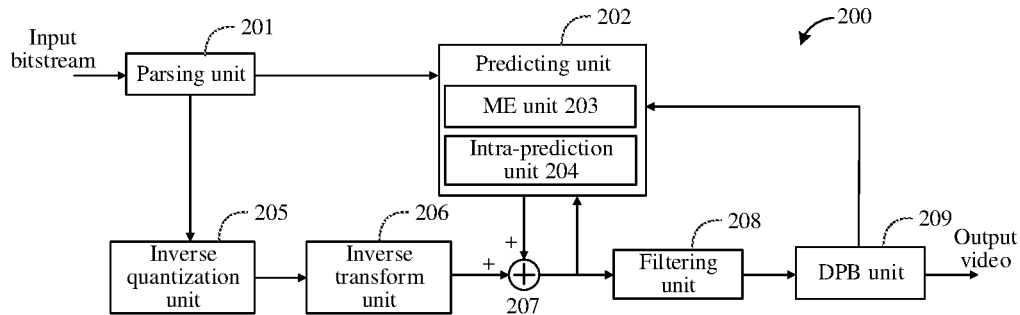
FIG. 3 is a diagram of system composition of a decoder according to embodiments of the disclosure.

FIG. 3 is a block diagram of system composition of a decoder according to embodiments of the disclosure. As shown in FIG. 3, the decoder 200 may include a decoding unit 201, a predicting unit 202, an inverse quantization unit 205, an inverse transform unit 206, an adder 207, a filtering unit 208, and a DPB unit 209. An input of the decoder 200 may be a bitstream configured to denote a compressed version of a video or a static picture. An output of the decoder 200 may be a decoded video composed of a series of pictures or a decoded static picture.

The input bitstream of the decoder 200 may be a bitstream generated by the encoder 100. The decoding unit 201 may decode the input bitstream and acquire a value of a syntax element from the input bitstream. The decoding unit 201 may convert a binary representation of the syntax element into a digital value and send the digital value to a unit in the decoder 200 to acquire one or more decoded pictures. The decoding unit 201 may further decode the input bitstream to acquire one or more syntax elements for displaying a decoded picture.

In decoding by the decoder 200, the decoding unit 201 may send a value of a syntax element and one or more variables to a unit in the decoder 200. The one or more variables may be set or determined based on the value of the syntax element and configured to acquire one or more decoded pictures.

The predicting unit 202 may determine a predicted block of a current decoding block (such as a CU). The predicting unit 202 may include an MC unit 203 and an intra-prediction unit 204. Specifically, when it is indicated to decode the current decoding block through inter-decoding, the predicting unit 202 may deliver a relevant parameter sent by the decoding unit 201 to the MC unit 203 to acquire an inter-predicted block. When it is indicated to decode the current decoding block through intra-prediction (including an MIP mode indicated by an MIP mode index), the predicting unit 202 may transmit the relevant parameter sent by the decoding unit 201 to the intra-prediction unit 204 to acquire an intra-predicted block.

The inverse quantization unit 205 may have a function same as that of the inverse quantization unit 110 in the encoder 100. The inverse quantization unit 205 may scale quantized coefficients (i.e., levels) sent by the decoding unit 201 to acquire reconstructed coefficients.

The inverse transform unit 206 may have a function same as that of the inverse transform unit 111 in the encoder 100. The inverse transform unit 206 may perform one or more transform operations (i.e., the inverse operation of one or more transform operations performed by the inverse transform unit 111 in the encoder 100) to acquire reconstructed residuals.

The adder 207 may add inputs (from any predicted block sent by the predicting unit 202 and the reconstructed residuals sent by the inverse transform unit 206) per se to acquire a reconstructed block of the current decoding block. The reconstructed block may further be sent to the predicting unit 202 as a reference for another block coded through intra-prediction.

After each CU in a picture or sub-picture has been reconstructed, the filtering unit 208 may perform loop filtering on the reconstructed picture or sub-picture. The filtering unit 208 may include one or more filters such as a deblocking filter, a sample adaptive compensation filter, an ALF, an LMCS filter, and a filter based on a neural network, etc. Alternatively, when the filtering unit 208 determines that a reconstructed block is not used as a reference for decoding another block, the filtering unit 208 may perform loop filtering on one or more target pixels in the reconstructed block. An output of the filtering unit 208 may be a decoded picture or sub-picture. The decoded picture or sub-picture may be cached in the DPB unit 209. The DPB unit 209 may output the decoded picture or sub-picture based on timing and control information. A picture stored in the DPB unit 209 may further be used as a reference for inter-prediction or intra-prediction performed by the predicting unit 202.

Further, the decoder 200 may have a second processor and a second memory recording a computer program. When the second processor reads and runs the computer program, the decoder 200 reads an input bitstream and generate a decoded video corresponding to the input bitstream. In addition, the decoder 200 may further be a computing device having one or more chips. A unit implemented as an integrated circuit on a chip may have a connection and a data exchange function similar to those of a corresponding unit in FIG. 3.

Further note that when applying embodiments of the disclosure to the encoder 100, a current block specifically refers to a block in a video picture under consideration that is about to be coded (also referred to as a coding block). When applying embodiments of the disclosure to the decoder 200, a current block specifically refers to a block in a video picture that is about to be decoded (also referred to as a decoding block).

Figure 4:
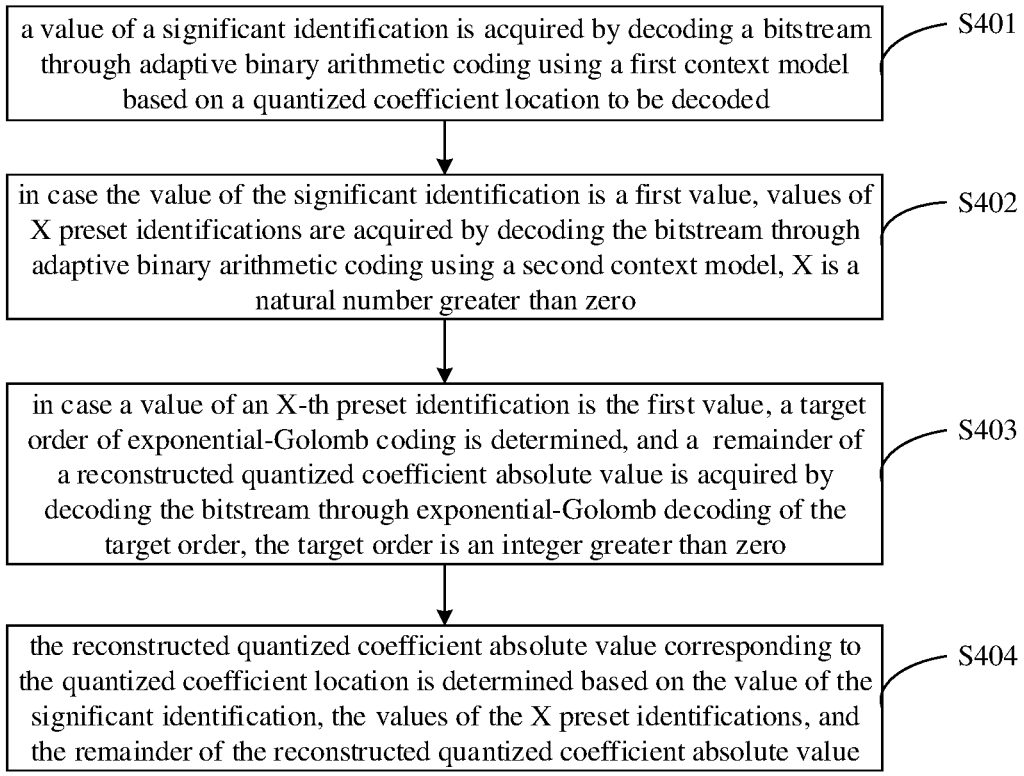
FIG. 4 is a flowchart of a method for decoding a coefficient according to embodiments of the disclosure.

In an embodiment of the disclosure, FIG. 4 is a flowchart of a method for decoding a coefficient according to embodiments of the disclosure. As shown in FIG. 4, the method may include operations as follows.

At S401, a value of a significant identification is acquired by decoding a bitstream through adaptive binary arithmetic coding using a first context model based on a quantized coefficient location to be decoded.

At S402, in case the value of the significant identification is a first value, values of X preset identifications are acquired by decoding the bitstream through adaptive binary arithmetic coding using a second context model. X is a natural number greater than zero.

At S403, in case a value of an X-th preset identification is the first value, a target order of exponential-Golomb coding is determined, and a remainder of a reconstructed quantized coefficient absolute value is acquired by decoding the bitstream through exponential-Golomb decoding of the target order. The target order is an integer greater than zero.

At S404, the reconstructed quantized coefficient absolute value corresponding to the quantized coefficient location is determined based on the value of the significant identification, the values of the X preset identifications, and the remainder of the reconstructed quantized coefficient absolute value.

Note that a decoding method according to embodiments of the disclosure mainly applies to a decoder. Specifically, based on the structure of composition of the decoder 200 as shown in FIG. 3, a decoding method according to embodiments of the disclosure mainly applies to the decoding unit 201 in the decoder 200. The decoding unit 201 may acquire a value of a preset identification by performing adaptive binary arithmetic coding based on a context model, and then acquire a remainder of an absolute value by performing decoding through exponential-Golomb decoding of a target order, thereby acquiring a reconstructed quantized coefficient.

Specifically, in embodiments of the disclosure, residuals of a block to be interpreted may be acquired by performing intra-prediction or inter-prediction on a video signal. The residual signal may further be transformed into transform coefficients (coefficients for short). For ease of description, a residual signal yet to be transformed and a transformed residual signal may be collectively referred to as transform coefficients. In order to be compressed effectively, the transform coefficients are to be quantized further. Quantization in general may be configured to lower a dynamic range of the transform coefficients, thereby expressing a video using less codewords. Quantized numerical values may be referred to as quantized coefficients, and in general may also be referred to as a level, a quantization level, or a quantization rank. A transform coefficient may be quantized in general by dividing the transform coefficient by a quantization step size. The quantization step size may be determined by a quantization factor delivered in the bitstream. The encoder is to further perform entropy coding on quantized coefficients before writing the quantized coefficients into the bitstream. Accordingly, the decoder is to acquire reconstructed quantized coefficients by decoding the bitstream. Thus, inverse quantization may be implemented by multiplying the reconstructed quantized coefficients by the quantization step size to acquire reconstructed transform coefficients. For a N×M block, each transform coefficient may be quantized independently. The technology may also be widely applied to a lot of international video compression standards such as H.264, HEVC, etc.

Understandably, in a latest international video compression standard, in quantization, a better mode of quantization may be selected using characteristics of the quantized coefficients using a correlation between transform coefficients, thereby optimizing quantization. To facilitate forming a video bit rate, a 2D coefficient block may be transformed into a one-dimensional coefficient stream in a specific order. The order of scan may be a zigzag order of scan, a horizontal order of scan, a vertical order of scan, or any other order of scan. In most existing video coding standards, non-binary levels are to be further binarized to acquire bins. A final bitstream may be produced by coding binary (or binarized) levels using a model-based binary arithmetic encoder.

In related art, at present a coefficient entropy coding method mainly includes CAVLC and CABAC. CABAC is a typical entropy coding technology currently supported in some coding standard. CABAC involves a number of stages including binarization, context model selection, binary arithmetic coding, etc. In binarization, any non-binary symbol or sign may be mapped to a binary sequence. In a context model, a modeled probability distribution may be assigned to an element being coded (also referred to as a binary symbol). Next, in subsequent binary arithmetic coding, coding is performed using the assigned probability distribution so as to produce a bit sequence denoted by coding. The bit sequence may form elements coded according to the assigned modeled probability distribution.

Coding a data symbol through CABAC involves one or more operations as follows.

(1) Binarization: If data to be coded are not binary values, the data are to be mapped to a series of binary numbers. Each binary number may have a value 0 or 1 referred to in general as bin.

(2) Context modeling (determining an index number of a context model): The data to be coded is context-correlated. A suitable probability model may be selected for the data to be coded using context information provided by coded data, which is context modeling (i.e., determining the context model). By constructing the context model, data redundancy may be lowered and a computational expense may be reduced by adapting a basic probability model to statistical characteristics changing with a video picture. There are in general a lot of context models each having a context index number per se denoted by ctxIdx. A probability lookup table of a distinct symbol may be indexed based on a context model corresponding to the symbol. That is, after receiving a symbol, an index number (ctxIdx) of a context model corresponding to the symbol may be found first. Then, a probability lookup table corresponding to the symbol may be found according to the ctxIdx.

(3) Binary number coding: Probability estimation according to a probability model found through context modeling may form an adaptive binary arithmetic encoder. The arithmetic encoder is to take probability of a bin value (i.e., probability of the binary number equaling 0 as well as probability of the binary number equaling 1) as an input. The principle of binary number coding is the same as general arithmetic coding other than that binary arithmetic coding involves a coding sequence having just two symbols 0 and 1, and involves just probabilities P (0) and P (1).

(4) State update: In arithmetic coding, a probability may not be fixed although one context model may be involved. Each new symbol input is to change the probability of a context model corresponding to the symbol. That is, a probability of selecting a context model may be updated based on an actual coded value of a binary number. For example, the probability of 1 may be increased if the binary number is 1.

Note that for syntax elements of a near uniform distribution, context modeling may be skipped by selecting a bypass mode in coding and decoding, accelerating coding and decoding.

Further note that exponential-Golomb coding is lossless data compression. k-th order exp-Golomb coding is a variable-length prefix code with straightforward hardware implementation, without the need to establish and store a code table in advance, capable of not only producing a codeword rapidly through hardware computation, but also adjusting the order k flexibly according to an information source, thus achieving efficient coding.

k-th order exponential-Golomb coding configured to denote a non-negative integer may be generated as follows.

In operation (1), a digit may be written in a binary form. The lowest k bits of the binary digit may be removed. 1 may be added to the remaining part of the binary digit.

In operation (2), a number of remaining bits may be computed. A number of leading zeros to be added to the remaining bits may be acquired by subtracting 1 from the number of remaining bits.

In operation (3), the lowest k bits removed in operation (1) may be put back into the string of bits as a tail of the string of bits.

Figure 5:
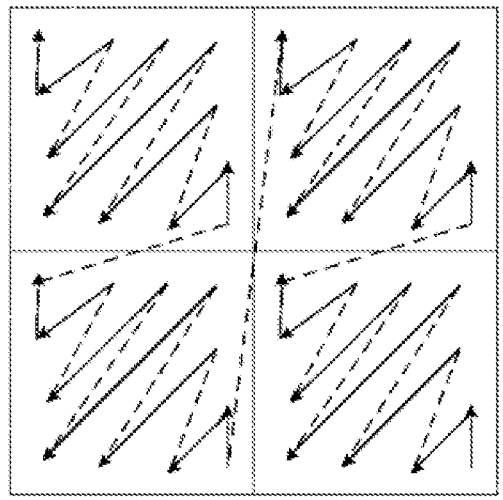
FIG. 5 is a diagram of a coefficient scan order in related art.

In a specific implementation, taking VVC as an example, transform coefficients in a transform block in VVC may be divided into a number of non-overlapping groups of coefficients. The size of a group of coefficients depends on the size of the transform block, and generally may be 1×16, 2×8, 8×2, 2×4, 4×2, 16×1, etc. FIG. 5 is a diagram of a coefficient scan order in related art. FIG. 5 gives an example of performing coding on a group of coefficients in a block to be interpreted and coefficients in the group of coefficients according to a diagonal order of scan in VVC.

In FIG. 5, VVC coefficient coding may start from a first non-zero coefficient at the lower right corner, continue along a predetermined order of scan, and end at a DC coefficient at the upper left corner. Several possible syntax elements may be written into the bitstream to denote a quantized coefficient at a location. The syntax elements mainly include sig_coeff_flag, abs_level_gtx_flag[0], par_level_flag, abs_level_gtx_flag[1], abs_remainder, dec_abs_level, coeff_sign_flag, etc. coeff_sign_flag may denote whether the quantized coefficient is non-zero/significant. abs_level_gtx_flag[0] may denote whether the absolute value of the quantized coefficient is greater than 1. par_level_flag may denote whether the quantized coefficient is an odd number or an even number. abs_level_gtx_flag[1] may denote whether the absolute value of the quantized coefficient is greater than 3. abs_remainder and dec_abs_level may denote the to-be-coded remainder of the absolute value of the quantized coefficient (where either abs_remainder or dec_abs_level may be used, and the to-be-coded remainder of the absolute value of the quantized coefficient may be referred to as the quantized coefficient absolute value remainder for short). coeff_sign_flag may denote positivity or negativity of a non-zero/significant quantized coefficient. A specific process of coding is as follows.

In the first operation, the significant flag sig_coeff_flag is coded. If a current quantized coefficient, i.e., a quantized coefficient under consideration, is 0, the significant flag is coded as 0. If the current quantized coefficient is not 0, the significant flag is coded as 1.

In the second operation, if sig_coeff_flag is 0, the process switches to the fifth operation below. If sig_coeff_flag is 1, abs_level_gtx_flag[0] is coded. If the absolute value of the current quantized coefficient is 1, abs_level_gtx_flag[0] is coded as 0. If the absolute value of the current quantized coefficient is not 1, abs_level_gtx_flag[0] is coded as 1.

In the third operation, if abs_level_gtx_flag[0] is 0, the process switches to the fifth operation. If abs_level_gtx_flag[0] is 1, par_level_flag is coded. If the current quantized coefficient is an even number, par_level_flag is coded as 0. If the current quantized coefficient is an odd number, par_level_flag is coded as 1. Then, abs_level_gtx_flag[1] is coded. If the absolute value of the current quantized coefficient is less than or equal to 3, abs_level_gtx_flag[1] is coded as 0. If the absolute value of the current quantized coefficient is greater than 3, abs_level_gtx_flag[1] is coded as 1.

In the fourth operation, if abs_level_gtx_flag[1] is 0, quantized coefficient coding at the location is done. If abs_level_gtx_flag[1] is 1, the remainder of the absolute value of the current quantized coefficient abs_remainder and dec_abs_level are coded.

In the fifth operation, if sig_coeff_flag is 0, quantized coefficient coding at the location is done. If sig_coeff_flag is 1, the coefficient sign flag coeff_sign_flag is coded according to positivity or negativity of the current quantized coefficient. If the quantized coefficient is positive, the coefficient sign flag is coded as 0. If the quantized coefficient is negative, the coefficient sign flag is coded as 1.

The correspondence between a respective flag (i.e., an syntax element) and an absolute value of a quantized coefficient is shown in table 1 as follows.

TABLE 1

| $|q_k|$ | 0 | 1 | 2 | 3 | 4 | 5 | 6 | 7 | 8 | 9 | ... |
|---|---|---|---|---|---|---|---|---|---|---|---|
| sig | 0 | 1 | 1 | 1 | 1 | 1 | 1 | 1 | 1 | 1 | ... |
| gt1 | — | 0 | 1 | 1 | 1 | 1 | 1 | 1 | 1 | 1 | ... |
| par | — | — | 0 | 1 | 0 | 1 | 0 | 1 | 0 | 1 | ... |
| gt3 | — | — | 0 | 0 | 1 | 1 | 1 | 1 | 1 | 1 | ... |
| rem | — | — | — | — | 0 | 0 | 1 | 1 | 2 | 2 | ... |

In table 1, $|q_k|$ denotes the absolute value of the quantized coefficient. sig denotes the significant flag, denoted by the syntax element sig_coeff_flag. gt1 denotes whether the absolute value of the quantized coefficient is greater than 1, denoted by the syntax element abs_level_gtx_flag[0]. par denotes whether the quantized coefficient is an odd number or an even number, denoted by the syntax element par_level_flag. gt3 denotes whether the absolute value of the quantized coefficient is greater than 3, denoted by the syntax element abs_level_gtx_flag[1]. rem denotes the remainder of the absolute value of the quantized coefficient, denoted by syntax elements abs_remainder and dec_abs_level.

The absolute value of the quantized coefficient is computed as $|q_k|$=sig+gt1+par+2×gt3+2×rem. The value of a nonexistent flag may be taken as 0. Further note that entropy coding may be performed in the bypass mode on the remainder of the absolute value of the quantized coefficient (abs_remainder and dec_abs_level) and the sign flag (coeff_sign_flag), and entropy coding may be performed in context model based adaptive coding on a flag other than the remainder of the absolute value of the quantized coefficient and the sign flag.

Figure 6:
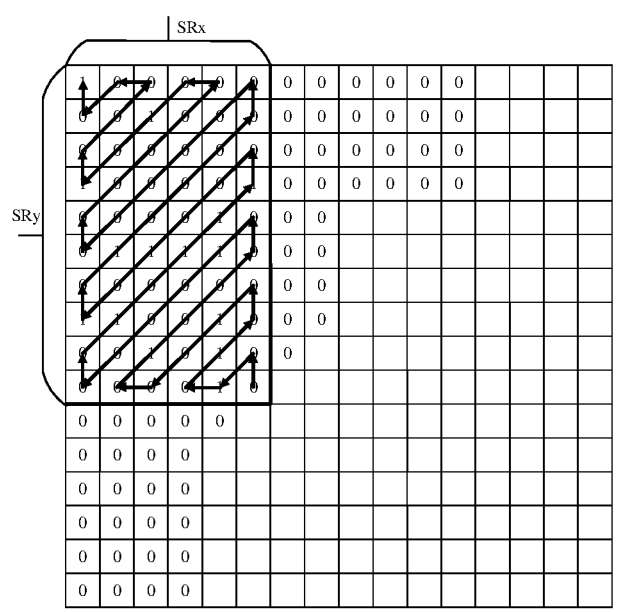
FIG. 6 is a diagram of another coefficient scan order in related art.

In another specific implementation, taking AVS as an example, any coefficient to be coded is limited within a range in general through SRCC in AVS3. Coefficient scan may be performed according to an inverse zigzag order starting from the lower right corner within the range, and end at a DC coefficient at the upper left corner. A coefficient scan order based on the scan region is as shown in FIG. 6.

Several possible syntax elements may be written into the bitstream to denote a quantized coefficient at a location. The syntax elements mainly include sig_flag, coeff_abs_level_greater1_flag, coeff_abs_level_greater2_flag, coeff_abs_level_remaining, coeff_sign, etc. sig_flag may denote whether the quantized coefficient is non-zero. coeff_abs_level_greater1_flag may denote whether the absolute value of the quantized coefficient is greater than 1. coeff_abs_level_greater2_flag may denote whether the absolute value of the quantized coefficient is greater than 2. coeff_abs_level_remaining may denote that the absolute value of the quantized coefficient is greater than 2, and may equal the absolute value of the quantized coefficient, minus 3. coeff_sign may denote positivity or negativity of a non-zero/significant quantized coefficient. A specific process of coding is as follows.

In the first operation, the significant flag sig_flag is coded. If a current quantized coefficient is 0, the significant flag is coded as 0. If the current quantized coefficient is not 0, the significant flag is coded as 1.

In the second operation, if sig_flag is 0, the process switches to the fifth operation below. If sig_flag is 1, coeff_abs_level_greater1_flag is coded. If the absolute value of the current quantized coefficient is 1, coeff_abs_level_greater1_flag is coded as 0. If the absolute value of the current quantized coefficient is not 1, coeff_abs_level_greater1_flag is coded as 1.

In the third operation, if coeff_abs_level_greater1_flag is 0, the process switches to the fifth operation below. If coeff_abs_level_greater1_flag is 1, coeff_abs_level_greater2_flag is coded. If the absolute value of the current quantized coefficient is 2, coeff_abs_level_greater2_flag is coded as 0. If the absolute value of the current quantized coefficient is greater than 2, coeff_abs_level_greater2_flag is coded as 1.

In the fourth operation, if coeff_abs_level_greater2_flag is 0, quantized coefficient coding at the location is done. If coeff_abs_level_greater2_flag is 1, the remainder of the absolute value of the current quantized coefficient coeff_abs_level_remaining is coded.

In the fifth operation, if sig_flag is 0, quantized coefficient coding at the location is done. If sig_flag is 1, the coefficient sign flag coeff_sign is coded according to positivity or negativity of the current quantized coefficient. If the quantized coefficient is positive, the coefficient sign flag is coded as 0. If the quantized coefficient is negative, the coefficient sign flag is coded as 1.

The correspondence between a respective flag (i.e., syntax element) and an absolute value of a quantized coefficient is shown in table 2 as follows.

TABLE 2

| $|q_k|$ | 0 | 1 | 2 | 3 | 4 | 5 | 6 | 7 | 8 | 9 | ... |
|---|---|---|---|---|---|---|---|---|---|---|---|
| sig | 0 | 1 | 1 | 1 | 1 | 1 | 1 | 1 | 1 | 1 | ... |
| gt1 | — | 0 | 1 | 1 | 1 | 1 | 1 | 1 | 1 | 1 | ... |
| gt2 | — | — | 0 | 1 | 1 | 1 | 1 | 1 | 1 | 1 | ... |
| rem | — | — | — | 0 | 1 | 2 | 3 | 4 | 5 | 6 | ... |

In table 2, $|q_k|$ denotes the absolute value of the quantized coefficient. sig denotes the significant flag, denoted by the syntax element sig_flag. gt1 denotes whether the absolute value of the quantized coefficient is greater than 1, denoted by the syntax element coeff_abs_level_greater1_flag. gt2 denotes whether the absolute value of the quantized coefficient is greater than 2, denoted by the syntax element coeff_abs_level_greater2_flag. rem denotes the remainder of the absolute value of the quantized coefficient, denoted by syntax elements coeff_abs_level_remaining.

The absolute value of the quantized coefficient is computed as $|q_k|$=sig+gt1+gt2+rem. The value of a nonexistent flag may be taken as 0. Further note that entropy coding may be performed in the bypass mode on the remainder of the absolute value of the quantized coefficient (coeff_abs_level_remaining) and the sign flag (coeff_sign), and entropy coding may be performed in context model based adaptive coding on a flag other than the remainder of the absolute value of the quantized coefficient and the sign flag.

Further note that in general, video coding in a video standard may include coding and decoding. Therefore, video coding may include coding at an encoder side and decoding at a decoder side. In embodiments of the disclosure, decoding at a decoder side is described first.

Embodiments of the disclosure mainly propose a mode of performing entropy coding on a quantized coefficient. A mode of scanning quantized coefficients is not limited here. For example, each of diagonal scan, zigzag scan, horizontal scan, vertical scan, scan by 4×4 sub-blocks, or any other scan may be an efficient mode of scan.

Specifically, for a quantized coefficient location to be decoded, a value of a significant identification is acquired by decoding a bitstream through adaptive binary arithmetic coding using a first context model. In some embodiment, after S401, the method may further include an operation below. In case the value of the significant identification is a second value, a reconstructed quantized coefficient corresponding to the quantized coefficient location is determined based on the value of the significant identification.

Note that significant identification may be denoted by the syntax element sig_coeff_flag or the syntax element sig_flag. Generally, significant identification may also be referred to as sig for short.

Further note that in some embodiment, the method may further include an operation as follows. If the value of the significant identification is a first value, it is determined that the reconstructed quantized coefficient is non-zero. If the value of the significant identification is the second value, it is determined that the reconstructed quantized coefficient is zero.

In embodiments of the disclosure, the first value may be 1. The second value may be 0.

Note that in another specific example, the first value may further be set as true, and the second value may further be set as false. In yet another specific example, the first value may further be set as 0, and the second value may further be set as 1. Alternatively, the first value may further be set as false, and the second value may further be set as true, which is not limited here.

That is, taking the first value being 1 and the second value being 0 as an example, If the decoded value of the significant identification is 1, then it may be determined that the reconstructed quantized coefficient is non-zero, in which case the bitstream is to be further decoded. If the decoded value of the significant identification is 0, then it may be determined that the reconstructed quantized coefficient is zero, in which case a next quantized coefficient location to be decoded may be determined.

Further note that values of X preset identifications may be denoted by an i-th preset identification. i may be a natural number greater than zero and less than or equal to X. Here, the i-th preset identification may be denoted by gti. The i-th preset identification may indicate whether the absolute value of the reconstructed quantized coefficient is greater than i. In some embodiment, the method may further include an operation as follows.

If the i-th preset identification equals the first value, it may be determined that the absolute value of the reconstructed quantized coefficient is greater than i.

If the i-th preset identification equals the second value, it may be determined that the absolute value of the reconstructed quantized coefficient is less than or equal to i.

That is, taking the first value being 1 and the second value being 0 as an example, if the i-th preset identification is decoded to be 1, then it may be determined that the absolute value of the reconstructed quantized coefficient is greater than i, in which case the bitstream is to be further decoded to acquire the value of an (i+1)-th preset identification; if the i-th preset identification is decoded to be 0, then it may be determined that the absolute value of the reconstructed quantized coefficient is less than or equal to i, in which case the absolute value of the reconstructed quantized coefficient corresponding to the quantized coefficient location may be determined according to a decoding result.

Specifically, when i equals X, for the X-th preset identification, the method may further include an operation as follows. If the value of the X-th preset identification is the first value, it may be determined that the absolute value of the reconstructed quantized coefficient is greater than X. If the value of the X-th preset identification is the second value, it may be determined that the absolute value of the reconstructed quantized coefficient is less than or equal to X.

Thus, having acquired the value of the X-th preset identification in S402, the method may further include an operation as follows.

In case the value of the X-th preset identification is the second value, the absolute value of the reconstructed quantized coefficient corresponding to the quantized coefficient location is determined based on the value of the significant identification and the values of the X preset identifications.

That is, taking the first value being 1 and the second value being 0 as an example, if the decoded value of the X-th preset identification is 1, then it may be determined that the absolute value of the reconstructed quantized coefficient is greater than X, in which case a target order of exponential-Golomb coding is to be determined further so as to decode the bitstream through exponential-Golomb decoding of the target order to acquire the remainder of the absolute value of the reconstructed quantized coefficient. Otherwise if the decoded value of the X-th preset identification is 0, then it may be determined that the absolute value of the reconstructed quantized coefficient is less than or equal to X, in which case no remainder of the absolute value of the reconstructed quantized coefficient has to be acquired through decoding. Instead, the absolute value of the reconstructed quantized coefficient corresponding to the quantized coefficient location may be determined straightforwardly based on the value of the significant identification and the values of the X preset identifications.

Further note that in case the value of the X-th preset identification is the first value, the target order of exponential-Golomb coding is to be determined. In a possible implementation, the target order of exponential-Golomb coding is to be determined by setting the target order as a fixed constant greater than zero.

In a specific example, the target order is set as 1.

Assuming that the target order is denoted by k, then exponential-Golomb coding of the target order may be marked as EGK(k). k is an integer greater than zero. Illustratively, exponential-Golomb coding of the 1-st order may be denoted by EGK(1).

In addition, a target order is zero-th in related art. A target order may be 1-st, 2-nd, 3-rd, etc., in embodiments of the disclosure. That is, the value of the target order may be a preset fixed constant such as 1, 2, 3, etc. In general, the target order is the 1-st order. That is, the remainder of the absolute value of the reconstructed quantized coefficient may be acquired through exponential-Golomb decoding of the 1-st order.

Further note that the target order may further be adjusted flexibly during coding and/or decoding. In another possible implementation, the target order of exponential-Golomb coding may be determined as follows.

A mode identification used for the quantized coefficient location to be decoded may be determined.

The target order of exponential-Golomb coding may be determined based on the mode identification.

In a specific example, the target order of exponential-Golomb coding may be determined based on the mode identification as follows.

In case the mode identification indicates use of transformskip, the target order may be determined to be 1.

In case the mode identification indicates no use of transformskip, the target order may be determined to be 0.

Note that the target order may be determined based on another identification, such as a mode identification. In the decoder, the mode identification used for the quantized coefficient location to be decoded may be determined. The target order of exponential-Golomb coding may be determined based on the mode identification.

Illustratively, assuming that the mode identification is configured to indicate whether transformskip is used. Thus, having determined a mode identification used, if the mode identification indicates use of transformskip, then it may be determined that the target order is set as 1. That is, the bitstream is decoded through exponential-Golomb decoding of the 1-st order. If the mode identification indicates no use of transformskip, then it may be determined that the target order is set as 0. That is, the bitstream is decoded through exponential-Golomb decoding of the 0-th order, thereby acquiring the remainder of the absolute value of the reconstructed quantized coefficient.

In other words, the target order may be a preset fixed constant, or may be adjusted flexibly during coding and/or decoding, such as based on another identification, which is not specifically limited in embodiments of the disclosure.

Thus, after the target order of exponential-Golomb coding has been determined, the bitstream is decoded through exponential-Golomb decoding of the target order, thereby acquiring the remainder of the absolute value of the reconstructed quantized coefficient. Then, the absolute value of the reconstructed quantized coefficient may be determined based on the value of the significant identification, the values of the X preset identifications, and the remainder of the absolute value of the reconstructed quantized coefficient.

Further, in embodiments of the disclosure, for the X preset identifications, in a specific example, X equals 4. The four preset identifications may include a first preset identification, a second preset identification, a third preset identification, and a fourth preset identification.

The first preset identification may be configured to indicate whether the reconstructed quantized coefficient absolute value is greater than 1.

The second preset identification may be configured to indicate whether the reconstructed quantized coefficient absolute value is greater than 2.

The third preset identification may be configured to indicate whether the reconstructed quantized coefficient absolute value is greater than 3.

The fourth preset identification may be configured to indicate whether the reconstructed quantized coefficient absolute value is greater than 4.

Note that the first preset identification may be denoted by gt1. The second preset identification may be denoted by gt2. The third preset identification may be denoted by gt3. The fourth preset identification may be denoted by gt4. The same context model set may be used for gt1, gt2, gt3, and gt4. Alternatively, one context model set may be used for gt1 and gt2, and one context model set may be used for gt3 and gt4, which is not specifically limited in embodiments of the disclosure.

In some embodiment, if the same context model set (i.e., the second context model) is used for gt1, gt2, gt3, and gt4, then in case the value of the significant identification is the first value, the values of the X preset identifications are acquired by decoding the bitstream through adaptive binary arithmetic coding using the second context model, as follows.

A value of the first preset identification is acquired by decoding the bitstream through adaptive binary arithmetic coding using the second context model.

In case the value of the first preset identification is the first value, a value of the second preset identification is acquired by decoding the bitstream through adaptive binary arithmetic coding using the second context model.

In case the value of the second preset identification is the first value, a value of the third preset identification is acquired by decoding the bitstream through adaptive binary arithmetic coding using the second context model.

In case the value of the third preset identification is the first value, a value of the fourth preset identification is acquired by decoding the bitstream through adaptive binary arithmetic coding using the second context model.

In some embodiment, the second context model includes a second-first context model and a second-second context model. If one context model set (i.e., the second-first context model) is used for gt1 and gt2, and one context model set (i.e., the second-second context model) is used for gt3 and gt4, the values of the X preset identifications may be acquired by decoding the bitstream through adaptive binary arithmetic coding using the second context model, as follows.

The value of the first preset identification is acquired by decoding the bitstream through adaptive binary arithmetic coding using the second-first context model.

In case the value of the first preset identification is the first value, the value of the second preset identification is acquired by decoding the bitstream through adaptive binary arithmetic coding using the second-first context model.

In case the value of the second preset identification is the first value, the value of the third preset identification is acquired by decoding the bitstream through adaptive binary arithmetic coding using the second-second context model.

In case the value of the third preset identification is the first value, the value of the fourth preset identification is acquired by decoding the bitstream through adaptive binary arithmetic coding using the second model of the second context model.

That is, in a specific example, the first context model, the second-first context model, and the second-second context model may differ from each other. That is, one context model set (i.e., the first context model) is used for the significant identification, one context model set (i.e., the second-first context model) is used for gt1 and gt2, and one context model set (i.e., the second-second context model) is used for gt3 and gt4. Alternatively, in another specific example, the second-first context model and the second-second context model may correspond to each other completely. That is, one context model set (i.e., the second context model) may be used for gt1, gt2, gt3, and gt4.

Particularly, the number of models in a context model set is not specifically limited, neither is a way of determining an index number of a context model. In general, by default, an index number of a context model may be determined using an existing solution in related art.

Further, if gt4 equals 1, it means that the absolute value of the reconstructed quantized coefficient is greater than 4, in which case there must be the remainder of the absolute value of the reconstructed quantized coefficient. In some embodiment, the target order of exponential-Golomb coding may be determined in case the value of the X-th preset identification is the first value, as follows.

In case the value of the fourth preset identification is the first value, the target order of exponential-Golomb coding is determined, so as to acquire the remainder of the absolute value of the reconstructed quantized coefficient by decoding the bitstream through exponential-Golomb decoding of the target order.

In a specific example, in S404, the absolute value of the reconstructed quantized coefficient corresponding to the quantized coefficient location may be determined based on the value of the significant identification, the values of the X preset identifications, and the remainder of the absolute value of the reconstructed quantized coefficient, as follows.

The absolute value of the reconstructed quantized coefficient corresponding to the quantized coefficient location is acquired as a sum of the value of the significant identification, the value of the first preset identification, the value of the second preset identification, the value of the third preset identification, the value of the fourth preset identification, and the remainder of the absolute value of the reconstructed quantized coefficient.

Note that in case the value of the fourth preset identification is the first value, which specifically refers to when gt4 equals 1, the remainder (denoted by rem) of the absolute value of the reconstructed quantized coefficient may be acquired by decoding the bitstream through exponential-Golomb decoding of the target order. Then, the absolute value of the reconstructed quantized coefficient corresponding to the quantized coefficient location is acquired as a sum of values of sig, gt1, gt2, gt3, gt4, and rem.

Further, after the absolute value of the reconstructed quantized coefficient has been acquired, decoding may continue to acquire a value of a sign identification to determine positivity or negativity of the reconstructed quantized coefficient. In some embodiment, the method may further include an operation as follows.

A value of a sign identification is acquired by decoding the bitstream in a bypass mode.

The reconstructed quantized coefficient corresponding to the quantized coefficient location is determined based on the value of the sign identification and the absolute value of the reconstructed quantized coefficient.

Note that the bypass mode may refer to performing entropy decoding using an equal probability model. For positivity or negativity of the reconstructed quantized coefficient, in some embodiment, the method may further include an operation as follows. In response to the value of the sign identification being the first value, it is determined that the reconstructed quantized coefficient is negative. In response to the value of the sign identification being the second value, it is determined that the reconstructed quantized coefficient is positive.

That is, taking the first value being 1 and the second value being 0 as an example, if the sign identification is decoded to equal 1, then it may be determined that the reconstructed quantized coefficient is negative. If the sign identification is decoded to equal 0, then it may be determined that the reconstructed quantized coefficient is positive.

Further note that the decoding is performed in a relative order, which may be adjusted according to a specific standard as needed. In a possible implementation, the method may further include an operation as follows.

A coefficient block and a preset order of scan of the coefficient block are determined. The coefficient block may include at least one quantized coefficient location to be decoded.

The value of the significant identification and the values of the X preset identifications both corresponding to the at least one quantized coefficient location are acquired in turn by decoding the bitstream according to the preset order of scan.

A remainder of an absolute value of a reconstructed quantized coefficient corresponding to the at least one quantized coefficient location is acquired in turn by decoding the bitstream according to the preset order of scan.

The absolute value of the reconstructed quantized coefficient corresponding to the at least one quantized coefficient location is determined based on the value of the significant identification corresponding to the at least one quantized coefficient location, the values of the X preset identifications, and the remainder of the absolute value of the reconstructed quantized coefficient corresponding to the at least one quantized coefficient location.

Note that a preset order of scan may be an order of diagonal scan, zigzag scan, horizontal scan, vertical scan, scan by 4×4 sub-blocks, etc., which is not specifically limited in embodiments of the disclosure.

Further note that the implementation takes the VVC standard as an example. In VVC in related art, first, sig, gt1, par, and gt3 of the absolute value of each reconstructed quantized coefficient are decoded in turn according to a preset order of scan. Then, rem of the absolute value of each reconstructed quantized coefficient may be decoded in turn according to the preset order of scan. In embodiments of the disclosure, sig, gt1, gt2, gt3, and gt4 of the absolute value of each reconstructed quantized coefficient are decoded in turn according to a preset order of scan. Then, rem of the absolute value of each reconstructed quantized coefficient may be decoded in turn according to the preset order of scan.

In another possible implementation, the method may further include an operation as follows.

A coefficient block and a preset order of scan of the coefficient block are determined. The coefficient block may include at least one quantized coefficient location to be decoded.

The value of the significant identification corresponding to the at least one quantized coefficient location may be acquired in turn by decoding the bitstream according to the preset order of scan.

Values of X preset identifications corresponding to the at least one quantized coefficient location may be acquired in turn by decoding the bitstream according to the preset order of scan.

A remainder of an absolute value of a reconstructed quantized coefficient corresponding to the at least one quantized coefficient location may be acquired in turn by decoding the bitstream according to the preset order of scan.

The absolute value of the reconstructed quantized coefficient corresponding to the at least one quantized coefficient location may be determined based on the value of the significant identification corresponding to the at least one quantized coefficient location, the values of the X preset identifications corresponding to the at least one quantized coefficient location, and the remainder of the absolute value of the reconstructed quantized coefficient corresponding to the at least one quantized coefficient location.

Note that the implementation takes the AVS standard as an example. In AVS, first, sig of the absolute value of each reconstructed quantized coefficient may be decoded in turn according to a preset order of scan. Then, gt1 and gt2 of the absolute value of each reconstructed quantized coefficient may be decoded in turn according to the preset order of scan. Finally, rem of the absolute value of each reconstructed quantized coefficient may be decoded in turn according to the preset order of scan. In embodiments of the disclosure, first, sig of the absolute value of each reconstructed quantized coefficient may be decoded in turn according to a preset order of scan. Then, gt1, gt2, gt3, and gt4 of the absolute value of each reconstructed quantized coefficient may be decoded in turn according to the preset order of scan. Finally, rem of the absolute value of each reconstructed quantized coefficient may be decoded in turn according to the preset order of scan.

Besides, in some embodiment, the method may further include an operation as follows.

After inverse quantization has been performed on all reconstructed quantized coefficients of a decoding block, a reconstructed transform block is determined based on the acquired reconstructed transform coefficients.

A reconstructed residual block is acquired by performing inverse transform on the reconstructed transform block.

Further, in some embodiment, the method may further include an operation as follows.

A prediction parameter is acquired by decoding the bitstream.

A predicted block of the decoding block is acquired by performing prediction on the current block using the prediction parameter.

A reconstructed block of the decoding block is determined based on the reconstructed residual block and the predicted block.

Note that after inverse quantization has been performed on all reconstructed quantized coefficients of the decoding block, an $M_1 \times M_2$ reconstructed transform block may be formed using the acquired reconstructed transform coefficients. Then, the reconstructed residual block may be acquired by performing inverse transform on the reconstructed transform block. Inverse transform is performed on the reconstructed transform block. The inverse transform is the inverse process of transform in the encoder. Note that if the encoder performs no transform on some coefficient, then no inverse transform is to be performed on the coefficient, either.

In short, a quantized coefficient is referred to below as a level. Embodiments of the disclosure provide a new method for performing entropy coding on a quantized level, which specifically improves quantized level coding. Quantized level scan is not limited, and each of diagonal scan, zigzag scan, horizontal scan, vertical scan, scan by 4×4 sub-blocks, or any other scan may be an efficient mode of scan.

Level coding according to embodiments of the disclosure mainly includes 4 parts as follows.

A first part is a significant sign of a level (denoted by sig) configured to indicate whether the level is a non-zero coefficient.

A second part is a sign of an absolute value of the level being greater than X (denoted by gtx) configured to indicate whether the level is greater than X. X is a natural number greater than 0. The part may include at least a sign of the absolute value of the level being greater than X. Specifically, in embodiments of the disclosure, the part may include: a sign of the absolute value of the level being greater than 1 (denoted by gt1), a sign of the absolute value of the level being greater than 2 (denoted by gt2), a sign of the absolute value of the level being greater than 3 (denoted by gt3), and a sign of the absolute value of the level being greater than 4 (denoted by gt4).

A third part is a sign of a remainder of the absolute value of the level (denoted by rem). An order k of exponential-Golomb coding used in coding the remainder may be adjusted flexibly according to this level sign. In embodiments of the disclosure, k may equal 1. That is, exponential-Golomb coding of the 1-st order, denoted by EGK(1), may be used.

A fourth part is a flag of a sign of the level (denoted by coeff_sign) configured to indicate positivity or negativity of the level.

Further, in embodiments of the disclosure, a mode of coding the absolute value of a level is as shown in table 3.

TABLE 3

| $|q_k|$ | 0 | 1 | 2 | 3 | 4 | 5 | 6 | 7 | 8 | 9 | ... |
|---|---|---|---|---|---|---|---|---|---|---|---|
| sig | 0 | 1 | 1 | 1 | 1 | 1 | 1 | 1 | 1 | 1 | ... |
| gt1 | — | 0 | 1 | 1 | 1 | 1 | 1 | 1 | 1 | 1 | ... |
| gt2 | — | — | 0 | 1 | 1 | 1 | 1 | 1 | 1 | 1 | ... |
| gt3 | — | — | — | 0 | 1 | 1 | 1 | 1 | 1 | 1 | ... |
| gt4 | — | — | — | — | 0 | 1 | 1 | 1 | 1 | 1 | ... |
| rem | — | — | — | — | — | 0 | 1 | 2 | 3 | 4 | ... |

In table 3, $|q_k|$ denotes the absolute value of the level. sig denotes a significant flag, i.e., the significant identification. gt1 denotes whether the absolute value of the level is greater than 1. gt2 denotes whether the absolute value of the level is greater than 2. gt3 denotes whether the absolute value of the level is greater than 3. gt4 denotes whether the absolute value of the level is greater than 4. rem denotes the remainder of the absolute value of the level. The absolute value o the level is computed as $$|q_k| = \text{sig} + \text{gt1} + \text{gt2} + \text{gt3} + \text{gt4} + \text{rem} \tag{1}$$

During CABAC, one context model set, i.e., the first context model according to embodiments of the disclosure, may be used just for sig. One context model set, i.e., the second-first context model according to embodiments of the disclosure, may be used for gt1 and gt2. One context model set, i.e., the second-second context model according to embodiments of the disclosure, may be used for gt3 and gt4. The number of models in a context model set is not specifically limited, neither is a way of determining the index number of a context model. With embodiments of the disclosure, by default, the index number of a context model may be determined according to an existing solution in related art.

In a specific example, a method according to embodiments of the disclosure is implemented in a decoder as follows.

First, the decoder acquires bitstream information, and decodes a current decoding block. The decoder decodes levels according to a preset order of scan. Then, having determined a current quantized coefficient location to be decoded, the decoder starts decoding a current coefficient. A specific process is as follows.

At operation 1, the significant flag sig of the level is decoded first. The decoding may be performed using the first context model. The index number of the context model may be determined based on the location of the coefficient and coefficient information acquired through decoding. The context model may be determined based on the index number. Then, the bitstream is decoded through CABAC.

At operation 2, if sig is 1, the process switches to operation 3. Otherwise the process switches to operation 11.

At operation 3, the flag gt1 of the absolute value of the level being greater than 1 is decoded. The decoding may be performed using the second-first context model. The index number of the context model may be determined based on the location of the coefficient and coefficient information acquired through decoding. The context model may be determined based on the index number. The bitstream is decoded through CABAC.

At operation 4, if gt1 is 1, the process switches to operation 5. Otherwise the process switches to S11.

At operation 5, the flag gt2 of the absolute value of the level being greater than 2 is decoded. The decoding may be performed using the second-first context model. The index number of the context model may be determined based on the location of the coefficient and coefficient information acquired through decoding. The context model may be determined based on the index number. The bitstream is decoded through CABAC.

At operation 6, if gt2 is 1, the process switches to operation 5. Otherwise the process switches to operation 11.

At operation 7, the flag gt3 of the absolute value of the level being greater than 3 is decoded. The decoding may be performed using the second model of the second context model. The index number of the context model may be determined based on the location of the coefficient and coefficient information acquired through decoding. The context model may be determined based on the index number. The bitstream is decoded through CABAC.

At operation 8, if gt3 is 1, the process switches to operation 5. Otherwise the process switches to operation 11.

At operation 9, the flag gt4 of the absolute value of the level being greater than 4 is decoded. The decoding may be performed using the second model of the second context model. The index number of the context model may be determined based on the location of the coefficient and coefficient information acquired through decoding. The context model may be determined based on the index number. The bitstream is decoded through CABAC.

At operation 10, if gt4 is 1, the remainder rem of the absolute value of the level is decoded according to exponential-Golomb decoding of the 1-st order. Otherwise the process switches to operation 11.

At operation 11, the absolute value of the level is derived according to a result of the decoding. Then, a next quantized coefficient location to be decoded is determined according to the order of scan.

Specifically note that the process is performed in a relative order, which may be adjusted according to a specific standard as needed. Specifically, in the VVC standard, first, sig, gt1, par, and gt3 of the absolute value of each level may be decoded in turn according to the order of scan. Then, rem of the absolute value of each level may be decoded in turn according to the order of scan. In this case, according to embodiments of the disclosure, first, sig, gt1, gt2, gt3, and gt4 of the absolute value of each level may be decoded in turn according to the order of scan. Then, rem of the absolute value of each level may be decoded in turn according to the order of scan. In the AVS standard, first, sig of the absolute value of each level may be decoded in turn according to the order of scan. Then, gt1 and gt2 of the absolute value of each level may be decoded in turn according to the order of scan. Finally, rem of the absolute value of each level may be decoded in turn according to the order of scan. In this case, according to embodiments of the disclosure, first, sig of the absolute value of each level may be decoded in turn according to the order of scan. Then, gt1, gt2, gt3, and gt4 of the absolute value of each level may be decoded in turn according to the order of scan. Finally, rem of the absolute value of each level may be decoded in turn according to the order of scan.

Specifically, further note that the second-second context model used for gt3 and gt4 may correspond completely to the second-first context model used for gt1 and gt2. In other words, this case amounts to use of the second context model for all of gt1, gt2, gt3, and gt4. In addition, in addition to or instead of exponential-Golomb coding of the 1-st order, exponential-Golomb coding of the 0-th order, the 2-nd order, the 3-rd order, etc., may also be performed, which may be preset or adjusted flexibly as that of another order.

Further note that instead of being specifically directed at some specific video coding standard, coefficient entropy coding according to embodiments of the disclosure is universal. Thus, with a new method for coefficient entropy coding according to embodiments of the disclosure, identifications gt3 and gt4 are introduced, a context model corresponding to the identifications is constructed, and a method for coding/decoding a remainder is adjusted accordingly based on the context model, thereby improving original entropy coding of a transform coefficient, making better use of characteristics of adaptive coding, efficiently saving a bit rate, thus improving overall performance of coding and/or decoding.

In addition, application of a technical solution according to embodiments of the disclosure may further be extended to another standard such as MPEG, AOM, or any user-defined method for coefficient entropy coding.

Embodiments of the disclosure provide a method for decoding a coefficient, implemented by a decoder. A value of a significant identification is acquired by decoding a bitstream through adaptive binary arithmetic coding using a first context model based on a quantized coefficient location to be decoded. In case the value of the significant identification is a first value, values of X preset identifications are acquired by decoding the bitstream through adaptive binary arithmetic coding using a second context model. X is a natural number greater than zero. In case a value of an X-th preset identification is the first value, a target order of exponential-Golomb coding is determined. A remainder of a reconstructed quantized coefficient absolute value is acquired by decoding the bitstream through exponential-Golomb decoding of the target order. The target order is an integer greater than zero. The reconstructed quantized coefficient absolute value corresponding to the quantized coefficient location is determined based on the value of the significant identification, the values of the X preset identifications, and the remainder of the reconstructed quantized coefficient absolute value. Thus, by making the most of the statistical characteristics of the quantized coefficients at the respective locations, in addition to performing entropy coding on a newly introduced preset identification through a context model, a mode of coding a remainder of an absolute value of a quantized coefficient is adjusted, making better use of characteristics of adaptive coding during coding and/or decoding, thereby saving a bit rate, improving performance of coding and/or decoding.

Figure 7:
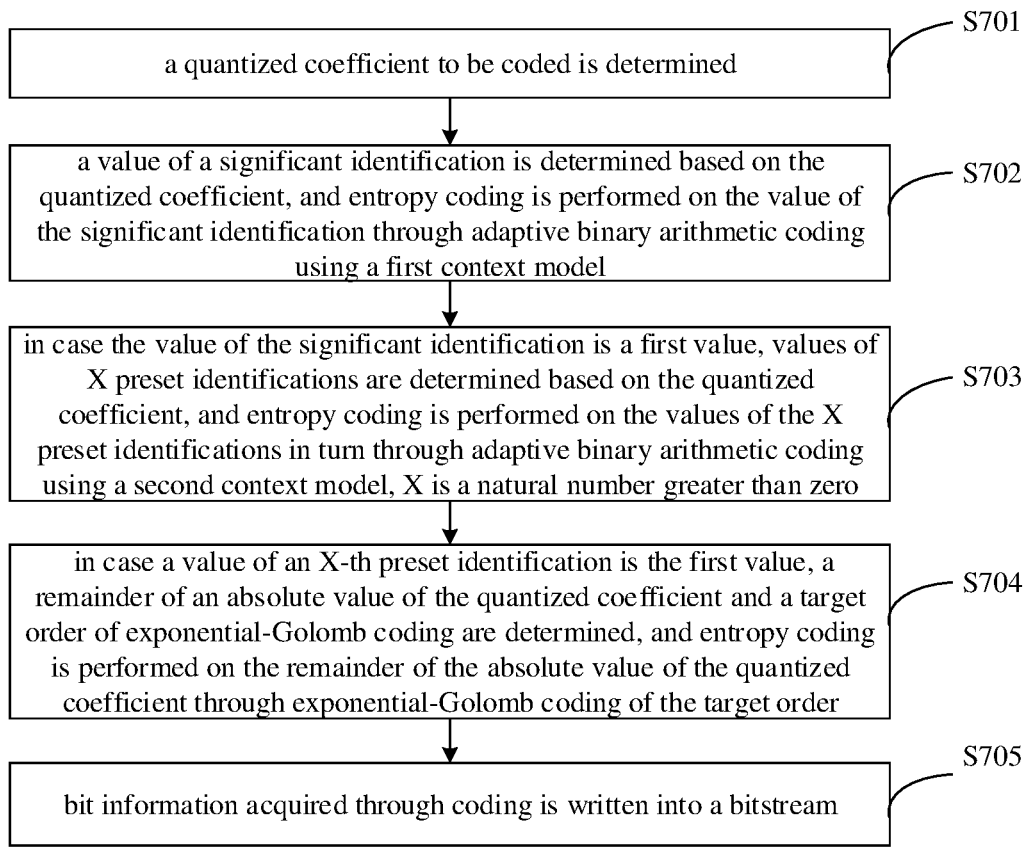
FIG. 7 is a flowchart of a method for coding a coefficient according to embodiments of the disclosure.

In another embodiment of the disclosure, FIG. 7 is a flowchart of a method for coding a coefficient according to embodiments of the disclosure. As shown in FIG. 7, the method may include operations as follows.

At S701, a quantized coefficient to be coded is determined.

At S702, a value of a significant identification is determined based on the quantized coefficient. Entropy coding is performed on the value of the significant identification through adaptive binary arithmetic coding using a first context model.

At S703, in case the value of the significant identification is a first value, values of X preset identifications are determined based on the quantized coefficient. Entropy coding is performed on the values of the X preset identifications in turn through adaptive binary arithmetic coding using a second context model. X is a natural number greater than zero.

At S704, in case a value of an X-th preset identification is the first value, a remainder of an absolute value of the quantized coefficient and a target order of exponential-Golomb coding are determined. Entropy coding is performed on the remainder of the absolute value of the quantized coefficient through exponential-Golomb coding of the target order.

At S705, bit information acquired through coding is written into a bitstream.

Note that a coding method according to embodiments of the disclosure mainly applies to an encoder. Specifically, based on the structure of composition of the encoder 100 as shown in FIG. 2, a coding method according to embodiments of the disclosure applies to the entropy coding unit 115 in the encoder 100. The entropy coding unit 115 may perform entropy coding on a quantized coefficient through adaptive binary arithmetic coding based on a context model, and then perform entropy coding on the remainder of the absolute value of the quantized coefficient through exponential-Golomb coding of the target order.

Further note that in general, video coding in a video standard may include coding and decoding. Therefore, video coding may include coding at an encoder side and decoding at a decoder side. In embodiments of the disclosure, coding at an encoder side is described.

Embodiments of the disclosure mainly propose a mode of performing entropy coding on a quantized coefficient. A mode of scanning quantized coefficients is not limited here. For example, each of diagonal scan, zigzag scan, horizontal scan, vertical scan, scan by 4×4 sub-blocks, or any other scan may be an efficient mode of scan.

Specifically, residuals of a block to be interpreted may be acquired by performing intra-prediction or inter-prediction on a video signal. The residual signal may further be transformed into transform coefficients (coefficients for short). For ease of description, a residual signal yet to be transformed and a transformed residual signal may be collectively referred to as transform coefficients. In order to be compressed effectively, the transform coefficients are to be quantized further. Quantization in general may be configured to lower a dynamic range of the transform coefficients, thereby expressing a video using less codewords. Quantized numerical values may be referred to as quantized coefficients, and in general may also be referred to as a level, a quantization level, or a quantization rank. A transform coefficient may be quantized in general by dividing the transform coefficient by a quantization step size. The quantization step size may be determined by a quantization factor delivered in the bitstream.

In some embodiment, having determined the quantized coefficient to be coded, the method may further include an operation as follows.

In case the quantized coefficient is non-zero, the value of the significant identification is determined to be the first value.

In case the quantized coefficient is zero, the value of the significant identification is determined to be the second value.

In embodiments of the disclosure, the first value may be 1. The second value may be 0.

Note that in another specific example, the first value may further be set as true, and the second value may further be set as false. In yet another specific example, the first value may further be set as 0, and the second value may further be set as 1. Alternatively, the first value may further be set as false, and the second value may further be set as true, which is not limited here.

The method may further include an operation as follows. In case the value of the significant identification is the second value, the bit information acquired through coding is written into the bitstream.

That is, taking the first value being 1 and the second value being 0 as an example, if the quantized coefficient is non-zero, then it may be determined that the value of the significant identification is 1, in which case another identification (such as the values of the X preset identifications) is to be determined further. If the quantized coefficient is zero, then it may be determined that the value of the significant identification is 0, meaning that coding of the quantized coefficient is done. After the bit information acquired through coding has been written into the bitstream, a next quantized coefficient to be coded may be determined.

Further note that values of X preset identifications may be denoted by an i-th preset identification. i may be a natural number greater than zero and less than or equal to X. Here, the i-th preset identification may be denoted by gti. The i-th preset identification may be configured to indicate whether the absolute value of the quantized coefficient is greater than i. In some embodiment, the values of the X preset identifications are determined based on the quantized coefficient as follows.

If the absolute value of the quantized coefficient is greater than i, it may be determined that the i-th preset identification equals the first value.

If the absolute value of the quantized coefficient is less than or equal to i, it may be determined that the i-th preset identification equals the second value.

That is, taking the first value being 1 and the second value being 0 as an example, if the absolute value of the quantized coefficient is greater than i, then it may be determined that the i-th preset identification equals 1, in which case the value of an (i+1)-th preset identification is to be determined further. If the absolute value of the quantized coefficient is less than or equal to i, then it may be determined that the i-th preset identification equals 0, in which case the value of the (i+1)-th preset identification does not have to be determined further.

Specifically, when i equals X, for the X-th preset identification, the values of the X preset identifications may be determined based on the quantized coefficient as follows. If the absolute value of the quantized coefficient is greater than X, it may be determined that the X-th preset identification equals the first value. If the absolute value of the quantized coefficient is less than or equal to X, it may be determined that the X-th preset identification equals a second value.

Thus, in some embodiment, i.e., having determined the value of the X-th preset identification, the method may further include an operation as follows. In case the value of the X-th preset identification is the second value, the bit information acquired through coding may be written into the bitstream.

That is, taking the first value being 1 and the second value being 0 as an example, if the absolute value of the quantized coefficient is greater than X, then it may be determined that the value of the X-th preset identification is 1, in which case the remainder of the absolute value of the quantized coefficient and the target order of exponential-Golomb coding are to be determined further so as to perform entropy coding on the remainder of the absolute value of the quantized coefficient through exponential-Golomb coding of the target order. If the absolute value of the quantized coefficient is less than or equal to X, then it may be determined that the value of the X-th preset identification is 0, meaning that the remainder of the absolute value of the quantized coefficient and the target order of exponential-Golomb coding do not have to be determined, and coding of the quantized coefficient is done. After the bit information acquired through coding has been written into the bitstream, a next quantized coefficient to be coded may be determined.

Further note that in case the value of the X-th preset identification is the first value, the target order of exponential-Golomb coding is to be determined. In a possible implementation, the target order of exponential-Golomb coding is to be determined by setting the target order as a fixed constant greater than zero.

In a specific example, the target order is set as 1.

Assuming that the target order is denoted by k, then exponential-Golomb coding of the target order may be marked as EGK(k). k is an integer greater than zero. Illustratively, exponential-Golomb coding of the 1-st order may be denoted by EGK(1).

In addition, a target order is zero-th in related art. A target order may be 1-st, 2-nd, 3-rd, etc., in embodiments of the disclosure. That is, the value of the target order may be a preset fixed constant such as 1, 2, 3, etc. In general, the target order is the 1-st order. That is, the remainder of the absolute value of the quantized coefficient may be acquired by performing entropy coding through exponential-Golomb decoding of the 1-st order.

Further note that the target order may further be adjusted flexibly during coding and/or decoding. In another possible implementation, the target order of exponential-Golomb coding may be determined as follows.

A mode identification used for the quantized coefficient may be determined.

The target order of exponential-Golomb coding may be determined based on the mode identification.

In a specific example, the target order of exponential-Golomb coding may be determined based on the mode identification, as follows.

In case the mode identification indicates use of transformskip, the target order may be determined to be 1.

In case the mode identification indicates no use of transformskip, the target order may be determined to be 0.

Note that the target order may be determined according to another identification, such as the mode identification. In the encoder, the mode identification used for the quantized coefficient to be coded may be determined. The target order of exponential-Golomb coding may be determined based on the mode identification.

Illustratively, assuming that the mode identification is configured to indicate whether transformskip is used. Thus, having determined a mode identification used, if the mode identification indicates use of transformskip, then it may be determined that the target order is set as 1. That is, entropy coding is performed on the remainder of the absolute value of the quantized coefficient through exponential-Golomb coding of the 1-st order. If the mode identification indicates not using transformskip, then it may be determined that the target order is set as 0. That is, entropy coding is performed on the remainder of the absolute value of the quantized coefficient through exponential-Golomb coding of the 0-th order.

In other words, the target order may be a preset fixed constant, or may be adjusted flexibly during coding, such as according to another identification, which is not specifically limited in embodiments of the disclosure.

Thus, after the target order of exponential-Golomb coding has been determined, the remainder of the absolute value of the quantized coefficient may be computed based on the quantized coefficient, the value of the significant identification, and the values of the X preset identifications. Then, entropy coding may be performed on the remainder of the absolute value of the quantized coefficient through exponential-Golomb coding of the target order.

Further, in embodiments of the disclosure, for the X preset identifications, in a specific example, X equals 4. The four preset identifications may include a first preset identification, a second preset identification, a third preset identification, and a fourth preset identification.

The first preset identification may be configured to indicate whether the absolute value of the quantized coefficient is greater than 1.

The second preset identification may be configured to indicate whether the absolute value of the quantized coefficient is greater than 2.

The third preset identification may be configured to indicate whether the absolute value of the quantized coefficient is greater than 3.

The fourth preset identification may be configured to indicate whether the absolute value of the quantized coefficient is greater than 4.

In a specific example, the values of the X preset identifications may be determined based on the quantized coefficient as follows.

If the absolute value of the quantized coefficient is greater than 1, it may be determined that a value of the first preset identification is the first value. Otherwise if the absolute value of the quantized coefficient is less than or equal to 1, it may be determined that the value of the first preset identification is a second value.

If the absolute value of the quantized coefficient is greater than 2, it may be determined that a value of the second preset identification is the first value. Otherwise if the absolute value of the quantized coefficient is less than or equal to 2, it may be determined that the value of the second preset identification is the second value.

If the absolute value of the quantized coefficient is greater than 3, it may be determined that a value of the third preset identification is the first value. Otherwise if the absolute value of the quantized coefficient is less than or equal to 3, it may be determined that the value of the third preset identification is the second value.

If the absolute value of the quantized coefficient is greater than 4, it may be determined that a value of the fourth preset identification is the first value. Otherwise if the absolute value of the quantized coefficient is less than or equal to 4, it may be determined that the value of the fourth preset identification is the second value.

Note that the first preset identification may be denoted by gt1. The second preset identification may be denoted by gt2. The third preset identification may be denoted by gt3. The fourth preset identification may be denoted by gt4.

Further note that the same context model set may be used for gt1, gt2, gt3, and gt4. Alternatively, one context model set may be used for gt1 and gt2, and one context model set may be used for gt3 and gt4, which is not specifically limited in embodiments of the disclosure.

In some embodiment, if the same context model set (i.e., the second context model) is used for gt1, gt2, gt3, and gt4, then entropy coding may be performed on the values of the X preset identifications in turn through adaptive binary arithmetic coding using the second context model, as follows.

Entropy coding may be performed on the value of the first preset identification, the value of the second preset identification, the value of the third preset identification, and the value of the fourth preset identification in turn through adaptive binary arithmetic coding using the second context model.

In some embodiment, the second context model includes a second-first context model and a second-second context model. If one context model set (i.e., the second-first context model) is used for gt1 and gt2, and one context model set (i.e., the second-second context model) is used for gt3 and gt4, entropy coding may be performed on the values of the X preset identifications in turn through adaptive binary arithmetic coding using the second context model, as follows.

Entropy coding may be performed on the value of the first preset identification and the value of the second preset identification in turn through adaptive binary arithmetic coding using the second-first context model.

Entropy coding may be performed on the value of the third preset identification and the value of the fourth preset identification in turn through adaptive binary arithmetic coding using the second-second context model.

That is, in a specific example, the first context model, the second-first context model, and the second-second context model may differ from each other. That is, one context model set (i.e., the first context model) is used for the significant identification, one context model set (i.e., the second-first context model) is used for gt1 and gt2, and one context model set (i.e., the second-second context model) is used for gt3 and gt4. Alternatively, in another specific example, the second-first context model and the second-second context model may correspond to each other completely. That is, one context model set (i.e., the second context model) may be used for gt1, gt2, gt3, and gt4.

Particularly, the number of models in a context model set is not specifically limited, neither is a way of determining the index number of a context model. In general, by default, the index number of a context model may be determined using an existing solution in related art.

Further, if the absolute value of the quantized coefficient is greater than 4, then on one hand it may be determined that gt4 equals 1, and on the other hand it may be determined that in this case there must be the remainder of the absolute value of the quantized coefficient. In some embodiment, the remainder of the absolute value of the quantized coefficient and the target order of exponential-Golomb coding may be determined in case the value of the X-th preset identification is the first value, as follows.

In case the value of the fourth preset identification is the first value, the remainder of the absolute value of the quantized coefficient and the target order of exponential-Golomb coding may be determined to perform entropy coding on the remainder of the absolute value of the quantized coefficient through exponential-Golomb coding of the target order.

In a specific example, the remainder of the absolute value of the quantized coefficient may be determined as follows.

The remainder of the absolute value of the quantized coefficient may be acquired by subtracting the value of the significant identification, the value of the first preset identification, the value of the second preset identification, the value of the third preset identification, and the value of the fourth preset identification from the absolute value of the quantized coefficient.

Note that in case the value of the fourth preset identification is the first value, which specifically refers to when gt4 equals 1, the remainder (denoted by rem) of the absolute value of the quantized coefficient may be determined according to the absolute value (denoted by $|q_k|$) of the quantized coefficient, sig, gt1, gt2, gt3, and gt4, as follows.

$$\text{rem} = |q_k| - \text{sig} - \text{gt1} - \text{gt2} - \text{gt3} - \text{gt4} \qquad (2)$$

Further, with embodiments of the disclosure, the value of a sign identification may further be determined based on the quantized coefficient to determine positivity or negativity of the quantized coefficient. In some embodiment, the method may further include an operation as follows.

A value of a sign identification may be determined based on the quantized coefficient.

Entropy coding may be performed on the remainder of the absolute value of the quantized coefficient in a bypass manner. The bit information acquired through coding may be written into the bitstream.

In a specific example, the value of the sign identification may be determined based on the quantized coefficient as follows.

In case the quantized coefficient is negative, it may be determined that the value of the sign identification is the first value.

In case the quantized coefficient is positive, it may be determined that the value of the sign identification is the second value.

Here, taking the first value being 1 and the second value being 0 as an example, if the quantized coefficient is negative, then it may be determined that the value of the sign identification is 1, in which case entropy coding may be performed on 1. If the quantized coefficient is positive, then it may be determined that the value of the sign identification is 0, in which case entropy coding may be performed on 0.

Further, the coding is performed in a relative order, which may be adjusted according to a specific standard as needed. In a possible implementation, the method may further include an operation as follows.

A coefficient block and a preset order of scan of the coefficient block may be determined. The coefficient block may include at least one quantized coefficient to be coded.

Entropy coding may be performed on the value of the significant identification and the values of the X preset identifications both corresponding to the at least one quantized coefficient according to the preset order of scan.

Entropy coding may be performed on a remainder of an absolute value of the at least one quantized coefficient in turn according to the preset order of scan.

Note that the implementation takes the VVC standard as an example. In VVC in related art, first, entropy coding may be performed on sig, gt1, par, and gt3 corresponding to each quantized coefficient in turn according to the preset order of scan. Then, entropy coding may be performed on rem corresponding to each quantized coefficient in turn according to the preset order of scan. In embodiments of the disclosure, first, entropy coding may be performed on sig, gt1, gt2, gt3, and gt4 corresponding to each quantized coefficient in turn according to the preset order of scan. Then, entropy coding may be performed on rem corresponding to each quantized coefficient in turn according to the preset order of scan.

In another possible implementation, the method may further include an operation as follows.

A coefficient block and a preset order of scan of the coefficient block may be determined. The coefficient block may include at least one quantized coefficient to be coded.

Entropy coding may be performed on the value of the significant identification corresponding to the at least one quantized coefficient in turn according to the preset order of scan.

Entropy coding may be performed on values of X preset identifications corresponding to the at least one quantized coefficient in turn according to the preset order of scan.

Entropy coding may be performed on a remainder of an absolute value of the at least one quantized coefficient in turn according to the preset order of scan.

Note that the implementation takes the AVS standard as an example. In AVS, first, entropy coding may be performed on sig corresponding to each quantized coefficient in turn according to the preset order of scan. Then, entropy coding may be performed on gt1 and gt2 corresponding to each quantized coefficient in turn according to the preset order of scan. Finally, entropy coding may be performed on rem corresponding to each quantized coefficient in turn according to the preset order of scan. In embodiments of the disclosure, first, entropy coding may be performed on sig corresponding to each quantized coefficient in turn according to the preset order of scan. Then, entropy coding may be performed on gt1, gt2, gt3, and gt4 corresponding to each quantized coefficient in turn according to the preset order of scan. Finally, entropy coding may be performed on rem corresponding to each quantized coefficient in turn according to the preset order of scan.

Further note that a preset order of scan may be an order of diagonal scan, zigzag scan, horizontal scan, vertical scan, scan by 4×4 sub-blocks, etc., which is not specifically limited in embodiments of the disclosure.

Quantized coefficient coding according to embodiments of the disclosure mainly includes 4 parts as follows.

A first part is a significant sign of a quantized coefficient (denoted by sig) configured to indicate whether the quantized coefficient is a non-zero coefficient.

A second part is a sign of an absolute value of the quantized coefficient being greater than X (denoted by gtx) configured to indicate whether the quantized coefficient is greater than X. X is a natural number greater than 0. The part may include at least a sign of the absolute value of the quantized coefficient being greater than X. Specifically, in embodiments of the disclosure, the part may include: a sign of the absolute value of the quantized coefficient being greater than 1 (denoted by gt1), a sign of the absolute value of the quantized coefficient being greater than 2 (denoted by gt2), a sign of the absolute value of the quantized coefficient being greater than 3 (denoted by gt3), and a sign of the absolute value of the quantized coefficient being greater than 4 (denoted by gt4).

A third part is a sign of a remainder of the absolute value of the quantized coefficient (denoted by rem). An order k of exponential-Golomb coding used in coding the remainder may be adjusted flexibly according to this level sign. In embodiments of the disclosure, k may equal 1. That is, exponential-Golomb coding of the 1-st order, denoted by EGK(1), may be used.

A fourth part is a flag of a sign of the quantized coefficient (denoted by coeff_sign) configured to indicate positivity or negativity of the quantized coefficient.

Further, in embodiments of the disclosure, a mode of coding the absolute value of a quantized coefficient is as shown in table 3. Note that the remainder (rem) of the absolute value of the quantized coefficient may be coded through exponential-Golomb coding of the target order. The sign flag (coeff_sign) may be coded in the bypass mode. Any flag (such as sig, gt1, gt2, gt3, gt4, etc.) other than the remainder and the sign flag may be coded through adaptive binary arithmetic coding based on a context model.

In addition, in some embodiment, before S701, the method may further include an operation as follows.

A CB in a video picture and a prediction parameter of the CB may be determined.

A predicted block of the CB may be determined by performing prediction on the CB using the prediction parameter.

A residual block of the CB may be acquired according to the CB and the predicted block.

A coefficient block of the CB may be acquired by transforming and quantizing the residual block. The coefficient block may include at least one quantized coefficient.

In embodiments of the disclosure, the method may further include an operation as follows. The prediction parameter may be written into the bitstream.

Note that a prediction parameter may be configured to indicate a mode of prediction used for a CB. A distinct mode of prediction may correspond to a distinct prediction parameter. A prediction parameter may be determined based on the size of a distortion value or a result of rate distortion optimization (RDO), which is not limited in any way in embodiments of the disclosure. In general, a prediction parameter of a CB may be determined by RDO. Specifically, in some embodiment, a prediction parameter of a CB may be determined as follows. Precoding may be performed on the CB using multiple modes of prediction, and rate distortion costs corresponding to the multiple modes of prediction are acquired. An optimal rate distortion cost in the acquired rate distortion costs may be selected. A mode of prediction corresponding to the optimal rate distortion cost may be determined as the prediction parameter of the CB.

That is, in the encoder, precoding may be performed on a CB using multiple modes of prediction respectively. The multiple modes of prediction in general may include inter-prediction, conventional intra-prediction, and non-conventional intra-prediction. Conventional intra-prediction may include a direct current (DC) mode, a planar mode, an angle intra-prediction mode, etc. Non-conventional intra-prediction may include an MIP mode, a cross-component linear model prediction (CCLM) mode, an intra block copy (IBC) mode, a PLT (palette) mode, etc. Inter-prediction may include conventional inter-prediction, geometrical partitioning for inter blocks (GEO), etc.

Illustratively, rate distortion costs corresponding to multiple modes of prediction may be acquired by performing precoding on a CB using the multiple modes of prediction respectively. Then, an optimal rate distortion cost (in general, the minimum rate distortion cost) in the acquired rate distortion costs may be selected. A mode of prediction corresponding to the optimal rate distortion cost may be determined as the prediction parameter of the CB. In this way, the encoder may perform prediction coding on the CB using the mode of prediction indicated by the prediction parameter, reducing a predicted residual, improving coding efficiency. Note that the prediction parameter is to be written into the bitstream such that the decoder acquires the prediction parameter by decoding the bitstream, and then acquires the predicted block corresponding to the CB by performing prediction.

In addition, a residual block may be determined by subtracting the predicted block acquired using the prediction parameter from the current block. Then, a transform block of the CB may be acquired by performing transform on the residual block. Full 2D transform, partial 2D transform, or even no 2D transform, may be performed on the residual block. In embodiments of the disclosure, a residual block, transformed or not transformed, may be referred to as a transform block. Then, the transform block may be quantized, acquiring the coefficient block of the CB.

Thus, after the coefficient block of the CB has been acquired, entropy coding may be performed on the at least one quantized coefficient using the preset order of scan, and the bit information acquired through coding may be written into the bitstream.

Specifically, further note that the second-second context model used for gt3 and gt4 may correspond completely to the second-first context model used for gt1 and gt2. In other words, this case amounts to use of the second context model for all of gt1, gt2, gt3, and gt4. In addition, in addition to or instead of exponential-Golomb coding of the 1-st order, exponential-Golomb coding of the 0-th order, the 2-nd order, the 3-rd order, etc., may also be performed, which may be preset or adjusted flexibly as that of another order.

Further note that instead of being specifically directed at some specific video coding standard, coefficient entropy coding according to embodiments of the disclosure is universal. Thus, with a new method for coefficient entropy coding according to embodiments of the disclosure, identifications gt3 and gt4 are introduced, a context model corresponding to the identifications is constructed, and a method for coding a remainder is adjusted accordingly based on the context model, improving original entropy coding of a transform coefficient, making better use of characteristics of adaptive coding, efficiently saving a bit rate, thus improving overall performance of coding and/or decoding.

In addition, application of a technical solution according to embodiments of the disclosure may further be extended to another standard such as MPEG, AOM, or any user-defined method for coefficient entropy coding.

Specifically, the order of exponential-Golomb coding used to code the remainder of an absolute value is to be determined. The order may be preset as a fixed constant such as 1, 2, 3, . . . , etc. Alternatively, the order may further be adjusted flexibly during coding, such as according to another flag. As a specific example, if transformskip is used for the current CB, the remainder of the absolute value may be coded through exponential-Golomb coding of the 1-st order. If no transformskip is used for the current CB, the remainder of the absolute value may be coded through exponential-Golomb coding of the 0-th order.

Embodiments of the disclosure provide a method for coding a coefficient, implemented by an encoder. A quantized coefficient to be coded is determined. A value of a significant identification is determined based on the quantized coefficient. Entropy coding is performed on the value of the significant identification through adaptive binary arithmetic coding using a first context model. In case the value of the significant identification is a first value, values of X preset identifications are determined based on the quantized coefficient. Entropy coding is performed on the values of the X preset identifications in turn through adaptive binary arithmetic coding using a second context model. X is a natural number greater than zero. In case a value of an X-th preset identification is the first value, a remainder of an absolute value of the quantized coefficient and a target order of exponential-Golomb coding are determined. Entropy coding is performed on the remainder of the absolute value of the quantized coefficient through exponential-Golomb coding of the target order. Bit information acquired through coding is written into a bitstream. Thus, by making the most of the statistical characteristics of the quantized coefficients at the respective locations, in addition to performing entropy coding on a newly introduced preset identification through a context model, a mode of coding a remainder of an absolute value of a quantized coefficient is adjusted, making better use of characteristics of adaptive coding during coding and/or decoding, thereby saving a bit rate, improving performance of coding and/or decoding.

Figure 8:
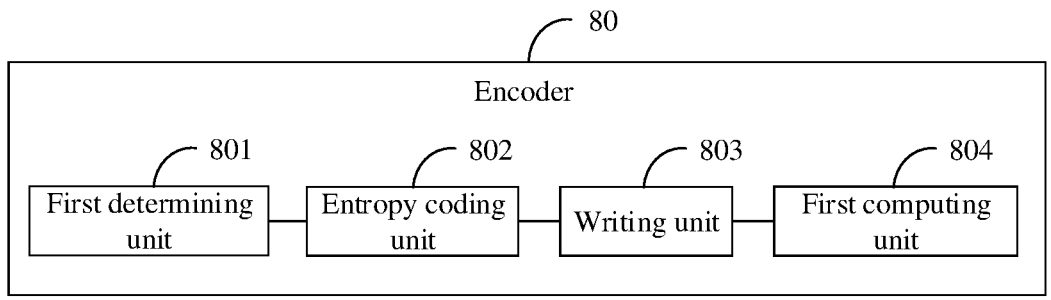
FIG. 8 is a diagram of a structure of composition of an encoder according to embodiments of the disclosure.

A further embodiment of the disclosure is based on an inventive concept same as an above embodiment. FIG. 8 is a diagram of a structure of composition of an encoder 80 according to embodiments of the disclosure. As shown in FIG. 8, the encoder 80 may include a first determining unit 801, an entropy coding unit 802, and a writing unit 803.

The first determining unit 801 may be configured to determine a quantized coefficient to be coded.

The entropy coding unit 802 may be configured to determine a value of a significant identification based on the quantized coefficient, and perform entropy coding on the value of the significant identification through adaptive binary arithmetic coding using a first context model; in case the value of the significant identification is a first value, determine values of X preset identifications based on the quantized coefficient, and perform entropy coding on the values of the X preset identifications in turn through adaptive binary arithmetic coding using a second context model. X is a natural number greater than zero.

The entropy coding unit 802 may be configured to, in case a value of an X-th preset identification is the first value, determine a remainder of an absolute value of the quantized coefficient and a target order of exponential-Golomb coding, and perform entropy coding on the remainder of the absolute value of the quantized coefficient through exponential-Golomb coding of the target order.

The writing unit 803 may be configured to write bit information acquired through coding into a bitstream.

In some embodiment, the first determining unit 801 may be configured to, in case the quantized coefficient is non-zero, determine the value of the significant identification is the first value; and in case the quantized coefficient is zero, determine the value of the significant identification being a second value.

In some embodiment, the writing unit 803 may be configured to write the bit information acquired through coding into the bitstream in case the value of the significant identification is a second value.

In some embodiment, the writing unit 803 may be configured to write the bit information acquired through coding into the bitstream in case the value of the X-th preset identification is a second value.

In some embodiment, the first value is 1, and the second value is 0.

In some embodiment, the first determining unit 801 may be configured to set the target order as a fixed constant greater than zero.

In some embodiment, the target order is set as 1.

In some embodiment, the first determining unit 801 may be configured to determine a mode identification used for the quantized coefficient; and determine the target order of exponential-Golomb coding based on the mode identification.

In some embodiment, the first determining unit 801 may be configured to determine the target order to be 1 in case the mode identification indicates use of transformskip; and determine the target order to be 0 in case the mode identification indicates no use of transformskip.

In some embodiment, the first determining unit 801 may be configured to determine that the X-th preset identification equals the first value in case the absolute value of the quantized coefficient is greater than X; and determine that the X-th preset identification equals a second value in case the absolute value of the quantized coefficient is less than or equal to X.

In some embodiment, X equals 4. The four preset identifications may include a first preset identification, a second preset identification, a third preset identification, and a fourth preset identification. The first preset identification may be configured to indicate whether the absolute value of the quantized coefficient is greater than 1. The second preset identification may be configured to indicate whether the absolute value of the quantized coefficient is greater than 2. The third preset identification may be configured to indicate whether the absolute value of the quantized coefficient is greater than 3. The fourth preset identification may be configured to indicate whether the absolute value of the quantized coefficient is greater than 4.

In some embodiment, the first determining unit 801 may be configured to determine that a value of the first preset identification is the first value in case the absolute value of the quantized coefficient is greater than 1; determine that the value of the first preset identification is a second value in case the absolute value of the quantized coefficient is less than or equal to 1; determine that a value of the second preset identification is the first value in case the absolute value of the quantized coefficient is greater than 2; determine that the value of the second preset identification is the second value in case the absolute value of the quantized coefficient is less than or equal to 2; determine that a value of the third preset identification is the first value in case the absolute value of the quantized coefficient is greater than 3; determine that the value of the third preset identification is the second value in case the absolute value of the quantized coefficient is less than or equal to 3; and determine that a value of the fourth preset identification is the first value in case the absolute value of the quantized coefficient is greater than 4; determine that the value of the fourth preset identification is the second value in case the absolute value of the quantized coefficient is less than or equal to 4.

In some embodiment, the entropy coding unit 802 may be configured to perform entropy coding on the value of the first preset identification, the value of the second preset identification, the value of the third preset identification, and the value of the fourth preset identification in turn through adaptive binary arithmetic coding using the second context model.

In some embodiment, the second context model includes a second-first context model and a second-second context model. Accordingly, the entropy coding unit 802 may be configured to perform entropy coding on the value of the first preset identification and the value of the second preset identification in turn through adaptive binary arithmetic coding using the second-first context model; and perform entropy coding on the value of the third preset identification and the value of the fourth preset identification in turn through adaptive binary arithmetic coding using the second-second context model.

In some embodiment, the first determining unit 801 may be configured to, in case the value of the fourth preset identification is the first value, determine the remainder of the absolute value of the quantized coefficient and the target order of exponential-Golomb coding to perform entropy coding on the remainder of the absolute value of the quantized coefficient through exponential-Golomb coding of the target order.

In some embodiment, referring to FIG. 8, the encoder 80 may further include a first computing unit 804 configured to acquire the remainder of the absolute value of the quantized coefficient by subtracting the value of the significant identification, the value of the first preset identification, the value of the second preset identification, the value of the third preset identification, and the value of the fourth preset identification from the absolute value of the quantized coefficient.

In some embodiment, the first determining unit 801 may be configured to determine a value of a sign identification based on the quantized coefficient.

The entropy coding unit 802 may be configured to perform entropy coding on the remainder of the absolute value of the quantized coefficient in a bypass mode.

The writing unit 803 may be configured to write the bit information acquired through coding into the bitstream.

In some embodiment, the first determining unit 801 may be configured to determine that the value of the sign identification is the first value in case the quantized coefficient is negative; and determine that the value of the sign identification is the second value in case the quantized coefficient is positive.

In some embodiment, the first determining unit 801 may be configured to determine a coefficient block and a preset order of scan of the coefficient block. The coefficient block may include at least one quantized coefficient to be coded.

The entropy coding unit 802 may be configured to perform entropy coding on the value of the significant identification and the values of the X preset identifications both corresponding to the at least one quantized coefficient according to the preset order of scan; and perform entropy coding on a remainder of an absolute value of the at least one quantized coefficient in turn according to the preset order of scan.

In some embodiment, the first determining unit 801 may be configured to determine a coefficient block and a preset order of scan of the coefficient block. The coefficient block may include at least one quantized coefficient to be coded.

The entropy coding unit 802 may be configured to perform entropy coding on the value of the significant identification corresponding to the at least one quantized coefficient in turn according to the preset order of scan; perform entropy coding on values of X preset identifications corresponding to the at least one quantized coefficient in turn according to the preset order of scan; and perform entropy coding on a remainder of an absolute value of the at least one quantized coefficient in turn according to the preset order of scan.

Understandably, in embodiments of the disclosure, a "unit" may be a part of a circuit, a part of a processor, a part of a program or software, etc. Of course, a unit may be a module, or may be non-modularized. In addition, components in the embodiments may be integrated in one processing part, or exist as separate physical units respectively. Alternatively, two or more units may be integrated in one unit. The integrated unit may be implemented in form of hardware or software functional unit(s).

When implemented in form of a software functional module and sold or used as an independent product, an integrated unit herein may be stored in a computer-readable storage medium. Based on such an understanding, the essential part of the technical solution of the embodiments or a part contributing to prior art or all or part of the technical solution may appear in form of a software product, which software product is stored in storage media, and includes a number of instructions for allowing computer equipment (such as a personal computer, a server, network equipment, and/or the like) or a processor to execute all or part of the operations of the methods of the embodiments. The storage media include various media that can store program codes, such as a U disk, a mobile hard disk, read only memory (ROM), random access memory (RAM), a magnetic disk, a CD, and/or the like.

Therefore, embodiments of the disclosure provide a computer storage medium, implemented by the encoder 80. The computer storage medium stores thereon a computer program which, when executed by the first processor, implements a method according to an embodiment herein.

Figure 9:
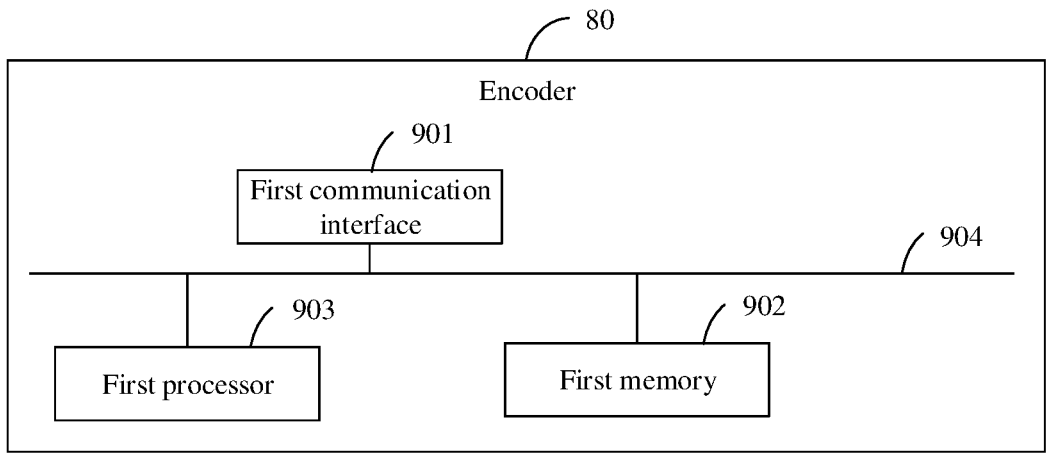
FIG. 9 is a diagram of a structure of specific hardware of an encoder according to embodiments of the disclosure.

Based on the composition of the encoder 80 and the computer storage medium, FIG. 9 shows a diagram of a structure of specific hardware of the encoder 80 according to embodiments of the disclosure. As shown in FIG. 9, the encoder may include a first communication interface 901, a first memory 902, and a first processor 903. Various components may be coupled together through a first bus system 904. Understandably, the first bus system 904 is used for implementing connection and communication among these components. In addition to a data bus, the first bus system 904 may further include a power bus, a control bus, and a status signal bus. However, for clarity of description, various buses are marked as the first bus system 904 in FIG. 9.

The first communication interface 901 may be configured to perform signal sending and receiving while performing information sending and receiving with another external network element.

The first memory 902 may be configured to store thereon a computer program executable on the first processor 903.

The first processor 903 may be configured to implement, when executing the computer program:
  determining a quantized coefficient to be coded;
  determining a value of a significant identification based on the quantized coefficient, and performing entropy coding on the value of the significant identification through adaptive binary arithmetic coding using a first context model;
  in response to the value of the significant identification being a first value, determining values of X preset identifications based on the quantized coefficient, and performing entropy coding on the values of the X preset identifications in turn through adaptive binary arithmetic coding using a second context model, wherein X is a natural number greater than zero;
  in response to a value of an X-th preset identification being the first value, determining a remainder of an absolute value of the quantized coefficient and a target order of exponential-Golomb coding, and performing entropy coding on the remainder of the absolute value of the quantized coefficient through exponential-Golomb coding of the target order; and
  writing bit information acquired through coding into a bitstream.

Understandably, the first memory 902 according to embodiments of the disclosure may be a volatile and/or a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be random access memory (RAM) serving as an external cache. By way of illustrative instead of restrictive description, there may be many forms of RAM available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synclink dynamic random access memory (synchlink DRAM, SLDRAM), direct rambus random access memory (DRRAM), etc. The first memory 902 used in a system and a method according to the disclosure is intended to include, but is not limited to, these and any other memory of suitable types.

The first processor 903 may be an integrated circuit chip capable of signal processing. In implementation, an operation of a method embodiment herein may be carried out via an integrated logic circuit of hardware in the first processor 903 or instructions in form of software. The first processor 903 may be a general-purpose processor, a digital signal processor (DSP), an application specific integrated circuit (ASIC), a field programmable gate array (FPGA), or another programmable logic device, a discrete gate, or a transistor logic device, a discrete hardware component, etc. The first processor 903 may implement or execute various methods, operations, and logical block diagrams according to embodiments of the disclosure. A general-purpose processor may be a microprocessor or any conventional processor. An operation of the method described in embodiments of the disclosure may be directly embodied as being carried out by a hardware decoding processor, or by a combination of hardware and software modules in the decoding processor. A software module may be located in a mature storage medium in the art, such as a random access memory (RAM), a flash memory, a read only memory (ROM), a programmable read-only memory (PROM), an electrically rewritable programmable memory, a register, etc. The storage medium may be located in the first memory 902. The first processor 903 may read information in the first memory 902, and combine it with hardware of the processor to perform an operation of a method herein.

Understandably, the embodiments according to the disclosure may be implemented by hardware, software, firmware, middleware, a microcode, or a combination of the any listed item. For hardware implementation, the processing unit may be implemented in one or more application specific integrated circuits (ASIC), DSP, digital signal processing devices (DSP Device, DSPD), programmable logic devices (PLD), field-programmable gate arrays (FPGA), general-purpose processors, controllers, micro controller units (MCU), microprocessors, and other electronic units for implementing the function of the disclosure, or a combination thereof. For software implementation, technology according to the disclosure may be implemented by a module, such as a process, a function, etc., that implements the function of the disclosure. A software code may be stored in the memory and executed by the processor. The memory may be implemented internal or external to the processor.

Optionally, as another embodiment, the first processor 903 may further be configured to execute a method according to an embodiment herein when executing the computer program.

The embodiment provides an encoder. The encoder may include a first determining unit, an entropy coding unit, and a writing unit. Thus, by making the most of the statistical characteristics of the quantized coefficients at the respective locations, in addition to performing entropy coding on a newly introduced preset identification through a context model, a mode of coding a remainder of an absolute value of a quantized coefficient is adjusted, making better use of characteristics of adaptive coding during coding and/or decoding, thereby saving a bit rate, improving performance of coding and/or decoding.

Figure 10:
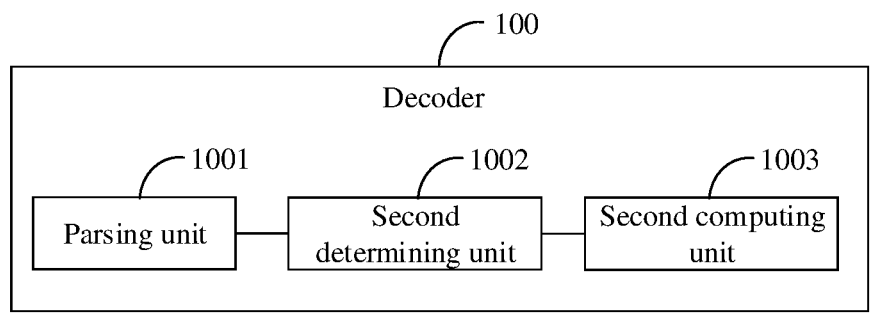
FIG. 10 is a diagram of a structure of composition of a decoder according to embodiments of the disclosure.

A further embodiment of the disclosure is based on an inventive concept same as an above embodiment. FIG. 10 is a diagram of a structure of composition of a decoder 100 according to embodiments of the disclosure. As shown in FIG. 10, the decoder 100 may include a decoding unit 1001 and a second determining unit 1002.

The decoding unit 1001 may be configured to acquire a value of a significant identification by decoding a bitstream through adaptive binary arithmetic coding using a first context model based on a quantized coefficient location to be decoded.

The decoding unit 1001 may be configured to acquire values of X preset identifications by decoding the bitstream through adaptive binary arithmetic coding using a second context model in case the value of the significant identification is a first value. X is a natural number greater than zero. The decoding unit may be configured to, in case a value of an X-th preset identification is the first value, determine a target order of exponential-Golomb coding, and acquire a remainder of a reconstructed quantized coefficient absolute value by decoding the bitstream through exponential-Golomb decoding of the target order. The target order is an integer greater than zero.

The second determining unit 1002 may be configured to determine the reconstructed quantized coefficient absolute value corresponding to the quantized coefficient location based on the value of the significant identification, the values of the X preset identifications, and the remainder of the reconstructed quantized coefficient absolute value.

In some embodiment, the second determining unit 1002 may be configured to determine a reconstructed quantized coefficient corresponding to the quantized coefficient location based on the value of the significant identification in response to the value of the significant identification being a second value.

In some embodiment, the second determining unit 1002 may be configured to determine the reconstructed quantized coefficient absolute value corresponding to the quantized coefficient location based on the value of the significant identification and the values of the X preset identifications in response to the value of the X-th preset identification being a second value.

In some embodiment, the first value is 1, and the second value is 0.

In some embodiment, the second determining unit 1002 may be configured to set the target order as a fixed constant greater than zero.

In some embodiment, the target order is set as 1.

In some embodiment, the second determining unit 1002 may be configured to determine a mode identification used for the quantized coefficient location to be decoded; and determine the target order of exponential-Golomb coding based on the mode identification.

In some embodiment, the second determining unit 1002 may be configured to determine the target order to be 1 in response to the mode identification indicating use of transformskip; and determine the target order to be 0 in response to the mode identification indicating no use of transformskip.

In some embodiment, X equals 4. The four preset identifications may include a first preset identification, a second preset identification, a third preset identification, and a fourth preset identification.

The first preset identification may be configured to indicate whether the reconstructed quantized coefficient absolute value is greater than 1.

The second preset identification may be configured to indicate whether the reconstructed quantized coefficient absolute value is greater than 2.

The third preset identification may be configured to indicate whether the reconstructed quantized coefficient absolute value is greater than 3.

The fourth preset identification may be configured to indicate whether the reconstructed quantized coefficient absolute value is greater than 4.

In some embodiment, the decoding unit 1001 may be configured to acquire a value of the first preset identification by decoding the bitstream through adaptive binary arithmetic coding using the second context model; acquire a value of the second preset identification by decoding the bitstream through adaptive binary arithmetic coding using the second context model in response to the value of the first preset identification being the first value; acquire a value of the third preset identification by decoding the bitstream through adaptive binary arithmetic coding using the second context model in response to the value of the second preset identification being the first value; and acquire a value of the fourth preset identification by decoding the bitstream through adaptive binary arithmetic coding using the second context model in response to the value of the third preset identification being the first value.

In some embodiment, the second context model includes a second-first context model and a second-second context model. Accordingly, the decoding unit 1001 may be configured to acquire the value of the first preset identification by decoding the bitstream through adaptive binary arithmetic coding using the second-first context model; acquire the value of the second preset identification by decoding the bitstream through adaptive binary arithmetic coding using the second-first context model in response to the value of the first preset identification being the first value; acquire the value of the third preset identification by decoding the bitstream through adaptive binary arithmetic coding using the second-second context model in response to the value of the second preset identification being the first value; and acquire the value of the fourth preset identification by decoding the bitstream through adaptive binary arithmetic coding using the second-second context model in response to the value of the third preset identification being the first value.

In some embodiment, the second determining unit 1002 may be configured to, in response to the value of the fourth preset identification being the first value, determine the target order of exponential-Golomb coding, to acquire the remainder of the reconstructed quantized coefficient absolute value by decoding the bitstream through exponential-Golomb decoding of the target order.

In some embodiment, referring to FIG. 10, the decoder 100 may further include a second computing unit 1003 configured to acquire the reconstructed quantized coefficient absolute value corresponding to the quantized coefficient location as a sum of the value of the significant identification, the value of the first preset identification, the value of the second preset identification, the value of the third preset identification, the value of the fourth preset identification, and the remainder of the reconstructed quantized coefficient absolute value.

In some embodiment, the decoding unit 1001 may be configured to acquire a value of a sign identification by decoding the bitstream in a bypass mode.

The second determining unit 1002 may be configured to determine a reconstructed quantized coefficient corresponding to the quantized coefficient location based on the value of the sign identification and the reconstructed quantized coefficient absolute value.

In some embodiment, the second determining unit 1002 may be configured to determine that the reconstructed quantized coefficient is negative in response to the sign identification being of the first value; and determine that the reconstructed quantized coefficient is positive in response to the sign identification being of the second value.

In some embodiment, the second determining unit 1002 may be configured to determine that the reconstructed quantized coefficient absolute value is greater than X in response to the value of the X-th preset identification being the first value; and determine that the reconstructed quantized coefficient absolute value is less than or equal to X in response to the value of the X-th preset identification being a second value.

In some embodiment, the second determining unit 1002 may be configured to determine a coefficient block and a preset order of scan of the coefficient block. The coefficient block may include at least one quantized coefficient location to be decoded.

The decoding unit 1001 may be configured to acquire the value of the significant identification and the values of the X preset identifications both corresponding to the at least one quantized coefficient location in turn by decoding the bitstream according to the preset order of scan, and acquire the remainder of the reconstructed quantized coefficient absolute value corresponding to the at least one quantized coefficient location in turn by decoding the bitstream according to the preset order of scan.

The second determining unit 1002 may be configured to determine the reconstructed quantized coefficient absolute value corresponding to the at least one quantized coefficient location based on the value of the significant identification, the values of the X preset identifications, and the remainder of the reconstructed quantized coefficient absolute value.

In some embodiment, the second determining unit 1002 may be configured to determine a coefficient block and a preset order of scan of the coefficient block. The coefficient block may include at least one quantized coefficient location to be decoded.

The decoding unit 1001 may be configured to acquire the value of the significant identification corresponding to the at least one quantized coefficient location in turn by decoding the bitstream according to the preset order of scan; acquire values of X preset identifications corresponding to the at least one quantized coefficient location in turn by decoding the bitstream according to the preset order of scan; and acquire the remainder of the reconstructed quantized coefficient absolute value corresponding to the at least one quantized coefficient location in turn by decoding the bitstream according to the preset order of scan.

The second determining unit 1002 may be configured to determine the reconstructed quantized coefficient absolute value corresponding to the at least one quantized coefficient location based on the value of the significant identification corresponding to the at least one quantized coefficient location, the values of the X preset identifications corresponding to the at least one quantized coefficient location, and the remainder of the reconstructed quantized coefficient absolute value corresponding to the at least one quantized coefficient location.

Understandably, in the embodiments, a "unit" may be a part of a circuit, a part of a processor, a part of a program or software, etc. Of course, a unit may be a module, or may be non-modularized. In addition, components in the embodiments may be integrated in one processing part, or exist as separate physical units respectively. Alternatively, two or more units may be integrated in one unit. The integrated unit may be implemented in form of hardware or software functional unit(s). When implemented in form of a software functional module and sold or used as an independent product, an integrated unit herein may be stored in a computer-readable storage medium. Based on such an understanding, the embodiments provide a computer storage medium, implemented by the decoder 100. The computer storage medium stores thereon a computer program which, when executed by the second processor, implements a method according to an embodiment herein.

Figure 11:
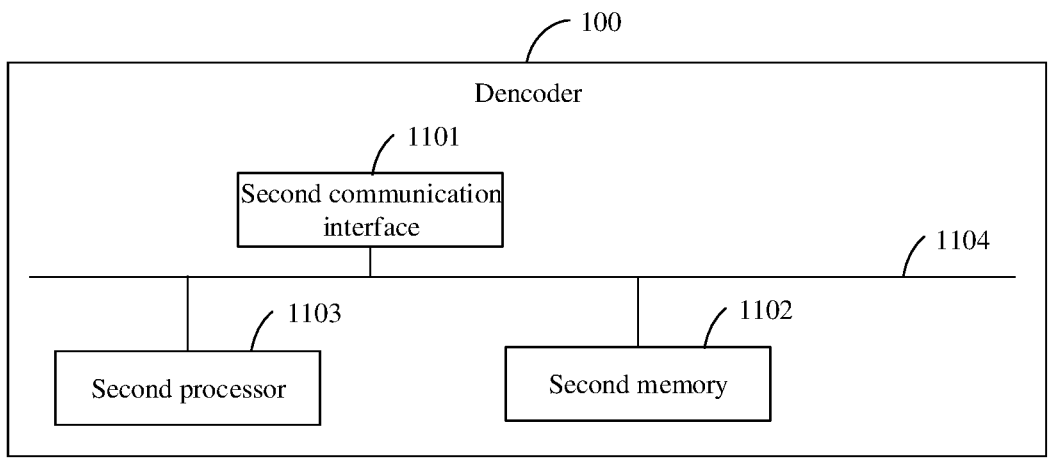
FIG. 11 is a diagram of a structure of specific hardware of a decoder according to embodiments of the disclosure.

Based on the composition of the decoder 100 and the computer storage medium, FIG. 11 shows a diagram of a structure of specific hardware of the decoder 100 according to embodiments of the disclosure. As shown in FIG. 11, the decoder may include a second communication interface 1101, a second memory 1102, and a second processor 1103. Various components may be coupled together through a second bus system 1104. Understandably, the second bus system 1104 is used for implementing connection and communication among these components. In addition to a data bus, the second bus system 1104 may further include a power bus, a control bus, and a status signal bus. However, for clarity of description, various buses are marked as the second bus system 1104 in FIG. 11.

The second communication interface 1101 may be configured to perform signal sending and receiving while performing information sending and receiving with another external network element.

The second memory 1102 may be configured to store thereon a computer program executable on the second processor 1103.

The second processor 1103 may be configured to implement, when executing the computer program:
  acquiring a value of a significant identification by decoding a bitstream through adaptive binary arithmetic coding using a first context model based on a quantized coefficient location to be decoded;
  in response to the value of the significant identification being a first value, acquiring values of X preset identifications by decoding the bitstream through adaptive binary arithmetic coding using a second context model, X being a natural number greater than zero;
  in response to a value of an X-th preset identification being the first value, determining a target order of exponential-Golomb coding, and acquiring a remainder of a reconstructed quantized coefficient absolute value by decoding the bitstream through exponential-Golomb decoding of the target order, the target order being an integer greater than zero; and
  determining the reconstructed quantized coefficient absolute value corresponding to the quantized coefficient location based on the value of the significant identification, the values of the X preset identifications, and the remainder of the reconstructed quantized coefficient absolute value.

Optionally, as another embodiment, the second processor 1103 may further be configured to execute a method according to an embodiment herein when executing the computer program.

Understandably, the second memory 1102 is similar to the first memory 902 in terms of a hardware function, and the second processor 1103 is similar to the first processor 903 in terms of a hardware function, which is not elaborated here.

The embodiment provides a decoder. The decoder may include a decoding unit and a second determining unit. Thus, by making the most of the statistical characteristics of the quantized coefficients at the respective locations, in addition to performing entropy coding on a newly introduced preset identification through a context model, a mode of coding a remainder of an absolute value of a quantized coefficient is adjusted, making better use of characteristics of adaptive coding during coding and/or decoding, thereby saving a bit rate, improving performance of coding and/or decoding.

Note that in the disclosure, a term such as "including/comprising", "containing", or any other variant of the term is intended to cover a non-exclusive inclusion, such that a process, method, article, or device including a series of elements not only includes the elements, but also includes other element(s) not explicitly listed, or element(s) inherent to such a process, method, article, or device. Given no more limitation, an element defined by a phrase "including a . . . " does not exclude existence of another identical element in a process, method, article, or device that includes the element.

Numbering of embodiments of the disclosure is merely for illustration and does not indicate preference of one embodiment over another.

Methods disclosed in method embodiments of the disclosure may be combined with each other as needed to acquire a new method embodiment, as long as no conflict results from the combination.

Features disclosed in product embodiments of the disclosure may be combined with each other as needed to acquire a new product embodiment, as long as no conflict results from the combination.

Features disclosed in method or device embodiments of the disclosure may be combined with each other as needed to acquire a new method or device embodiment, as long as no conflict results from the combination.

What described is just embodiments of the disclosure and is not intended to limit the scope of the disclosure. Any modification, equivalent replacement, and/or the like made within the technical scope of the disclosure, as may occur to a person having ordinary skill in the art, shall be included in the scope of the disclosure. The scope of the disclosure thus should be determined by the claims.

INDUSTRIAL APPLICABILITY

In embodiments of the disclosure, at an encoder side, first, a quantized coefficient to be coded is determined. Then, a value of a significant identification is determined based on the quantized coefficient. Entropy coding is performed on the value of the significant identification through adaptive binary arithmetic coding using a first context model. In case the value of the significant identification is a first value, values of X preset identifications are determined based on the quantized coefficient. Entropy coding is performed on the values of the X preset identifications in turn through adaptive binary arithmetic coding using a second context model. In case a value of an X-th preset identification is the first value, a remainder of an absolute value of the quantized coefficient and a target order of exponential-Golomb coding are determined. Entropy coding is performed on the remainder of the absolute value of the quantized coefficient through exponential-Golomb coding of the target order. Finally, bit information acquired through coding is written into a bitstream. At a decoder side, first, a value of a significant identification is acquired by decoding a bitstream through adaptive binary arithmetic coding using a first context model based on a quantized coefficient location to be decoded. Then, in case the value of the significant identification is a first value, values of X preset identifications are acquired by decoding the bitstream through adaptive binary arithmetic coding using a second context model. In case a value of an X-th preset identification is the first value, a target order of exponential-Golomb coding is determined. A remainder of a reconstructed quantized coefficient absolute value is acquired by decoding the bitstream through exponential-Golomb decoding of the target order. Finally, the reconstructed quantized coefficient absolute value corresponding to the quantized coefficient location is determined based on the value of the significant identification, the values of the X preset identifications, and the remainder of the reconstructed quantized coefficient absolute value. Thus, by making the most of the statistical characteristics of the quantized coefficients at the respective locations, in addition to performing entropy coding on a newly introduced preset identification through a context model, a mode of coding a remainder of an absolute value of a quantized coefficient is adjusted, making better use of characteristics of adaptive coding during coding and/or decoding, thereby saving a bit rate, improving performance of coding and/or decoding.

The invention claimed is:

1. A method for decoding a coefficient, implemented by a decoder, the method comprising:
    acquiring a value of a significant identification by decoding a bitstream through adaptive binary arithmetic coding using a first context model based on a quantized coefficient location to be decoded;
    in response to the value of the significant identification being a first value, acquiring values of X preset identifications by decoding the bitstream through adaptive binary arithmetic coding using a second context model, wherein X is a natural number greater than zero;
    in response to a value of an X-th preset identification being the first value, determining a target order of exponential-Golomb coding, and acquiring a remainder of a reconstructed quantized coefficient absolute value by decoding the bitstream through exponential-Golomb decoding of the target order, wherein the target order is an integer greater than zero; and
    determining the reconstructed quantized coefficient absolute value corresponding to the quantized coefficient location based on the value of the significant identification, the values of the X preset identifications, and the remainder of the reconstructed quantized coefficient absolute value.

2. The method of claim 1, further comprising:
    in response to the value of the significant identification being a second value, determining a reconstructed quantized coefficient corresponding to the quantized coefficient location based on the value of the significant identification; or
    in response to the value of the X-th preset identification being a second value, determining the reconstructed quantized coefficient absolute value corresponding to the quantized coefficient location based on the value of the significant identification and the values of the X preset identifications.

3. The method of claim 1, wherein the first value is 1, and a second value is 0.

4. The method of claim 1, wherein determining the target order of exponential-Golomb coding comprises:
    setting the target order as a fixed constant greater than zero.

5. The method of claim 1, wherein determining the target order of exponential-Golomb coding comprises:
    determining a mode identification used for the quantized coefficient location to be decoded; and
    determining the target order of exponential-Golomb coding based on the mode identification,
    wherein determining the target order of exponential-Golomb coding based on the mode identification comprises:
        in response to the mode identification indicating use of transformskip, determining the target order to be 1; and
        in response to the mode identification indicating no use of transformskip, determining the target order to be 0.

6. The method of claim 1, wherein X equals 4, wherein the four preset identifications comprise a first preset identification, a second preset identification, a third preset identification, and a fourth preset identification,
    wherein the first preset identification is configured to indicate whether the reconstructed quantized coefficient absolute value is greater than 1,
    wherein the second preset identification is configured to indicate whether the reconstructed quantized coefficient absolute value is greater than 2,
    wherein the third preset identification is configured to indicate whether the reconstructed quantized coefficient absolute value is greater than 3,
    wherein the fourth preset identification is configured to indicate whether the reconstructed quantized coefficient absolute value is greater than 4.

7. The method of claim 6, wherein
acquiring the values of the X preset identifications by decoding the bitstream through adaptive binary arithmetic coding using the second context model comprises:
    acquiring a value of the first preset identification by decoding the bitstream through adaptive binary arithmetic coding using the second context model;
    in response to the value of the first preset identification being the first value, acquiring a value of the second preset identification by decoding the bitstream through adaptive binary arithmetic coding using the second context model;
    in response to the value of the second preset identification being the first value, acquiring a value of the third preset identification by decoding the bitstream through adaptive binary arithmetic coding using the second context model; and
    in response to the value of the third preset identification being the first value, acquiring a value of the fourth preset identification by decoding the bitstream through adaptive binary arithmetic coding using the second context model;
or,
the second context model comprises a second-first context model and a second-second context model, wherein acquiring the values of the X preset identifications by decoding the bitstream through adaptive binary arithmetic coding using the second context model comprises:
    acquiring the value of the first preset identification by decoding the bitstream through adaptive binary arithmetic coding using the second-first context model;
    in response to the value of the first preset identification being the first value, acquiring the value of the second preset identification by decoding the bitstream through adaptive binary arithmetic coding using the second-first context model;

in response to the value of the second preset identification being the first value, acquiring the value of the third preset identification by decoding the bitstream through adaptive binary arithmetic coding using the second model of the second context model; and in response to the value of the third preset identification being the first value, acquiring the value of the fourth preset identification by decoding the bitstream through adaptive binary arithmetic coding using the second model of the second context model.

8. The method of claim 7, wherein determining the target order of exponential-Golomb coding in response to the value of the X-th preset identification being the first value comprises:

in response to the value of the fourth preset identification being the first value, determining the target order of exponential-Golomb coding, to acquire the remainder of the reconstructed quantized coefficient absolute value by decoding the bitstream through exponential-Golomb decoding of the target order, wherein determining the reconstructed quantized coefficient absolute value corresponding to the quantized coefficient location based on the value of the significant identification, the values of the X preset identifications, and the remainder of the reconstructed quantized coefficient absolute value comprises:

acquiring the reconstructed quantized coefficient absolute value corresponding to the quantized coefficient location as a sum of the value of the significant identification, the value of the first preset identification, the value of the second preset identification, the value of the third preset identification, the value of the fourth preset identification, and the remainder of the reconstructed quantized coefficient absolute value.

9. The method of claim 1, further comprising:

acquiring a value of a sign identification by decoding the bitstream in a bypass manner;

determining a reconstructed quantized coefficient corresponding to the quantized coefficient location based on the value of the sign identification and the reconstructed quantized coefficient absolute value, in response to the value of the sign identification being the first value, determining that the reconstructed quantized coefficient is negative; and in response to the value of the sign identification being a second value, determining that the reconstructed quantized coefficient is positive.

10. The method of claim 1, further comprising:

in response to the value of the X-th preset identification being the first value, determining that the reconstructed quantized coefficient absolute value is greater than X; and in response to the value of the X-th preset identification being a second value, determining that the reconstructed quantized coefficient absolute value is less than or equal to X;

or, the method further comprising:

determining a coefficient block and a preset order of scan of the coefficient block, wherein the coefficient block comprises at least one quantized coefficient location to be decoded;

acquiring the value of the significant identification and the values of the X preset identifications both corresponding to the at least one quantized coefficient location in turn by decoding the bitstream according to the preset order of scan;

acquiring the remainder of the reconstructed quantized coefficient absolute value corresponding to the at least one quantized coefficient location in turn by decoding the bitstream according to the preset order of scan; and determining the reconstructed quantized coefficient absolute value corresponding to the at least one quantized coefficient location based on the value of the significant identification, the values of the X preset identifications, and the remainder of the reconstructed quantized coefficient absolute value;

or, the method further comprising:

determining a coefficient block and a preset order of scan of the coefficient block, wherein the coefficient block comprises at least one quantized coefficient location to be decoded;

acquiring the value of the significant identification corresponding to the at least one quantized coefficient location in turn by decoding the bitstream according to the preset order of scan;

acquiring the values of the X preset identifications corresponding to the at least one quantized coefficient location in turn by decoding the bitstream according to the preset order of scan;

acquiring the remainder of the reconstructed quantized coefficient absolute value corresponding to the at least one quantized coefficient location in turn by decoding the bitstream according to the preset order of scan; and determining the reconstructed quantized coefficient absolute value corresponding to the at least one quantized coefficient location based on the value of the significant identification, the values of the X preset identifications, and the remainder of the reconstructed quantized coefficient absolute value.

11. A method for coding a coefficient, implemented by an encoder, the method comprising:

determining a quantized coefficient to be coded;

determining a value of a significant identification based on the quantized coefficient, and performing entropy coding on the value of the significant identification through adaptive binary arithmetic coding using a first context model;

in response to the value of the significant identification being a first value, determining values of X preset identifications based on the quantized coefficient, and performing entropy coding on the values of the X preset identifications in turn through adaptive binary arithmetic coding using a second context model, wherein X is a natural number greater than zero;

in response to a value of an X-th preset identification being the first value, determining a remainder of an absolute value of the quantized coefficient and a target order of exponential-Golomb coding, and performing entropy coding on the remainder of the absolute value of the quantized coefficient through exponential-Golomb coding of the target order; and writing bit information acquired through coding into a bitstream.

12. The method of claim 11, further comprising:

in response to the quantized coefficient being non-zero, determining the value of the significant identification being the first value; or in response to the quantized coefficient being zero, determining the value of the significant identification being a second value; or in response to the value of the significant identification being a second value, writing the bit information acquired through coding into the bitstream; or in response to the value of the X-th preset identification being a second value, writing the bit information acquired through coding into the bitstream.

13. The method of claim 11, wherein determining the values of the X preset identifications based on the quantized coefficient comprises:

in response to the absolute value of the quantized coefficient being greater than X, determining that the X-th preset identification equals the first value; and in response to the absolute value of the quantized coefficient being less than or equal to X, determining that the X-th preset identification equals a second value.

14. The method of claim 11, wherein X equals 4, wherein the four preset identifications comprise a first preset identification, a second preset identification, a third preset identification, and a fourth preset identification, wherein the first preset identification is configured to indicate whether the absolute value of the quantized coefficient is greater than 1, wherein the second preset identification is configured to indicate whether the absolute value of the quantized coefficient is greater than 2, wherein the third preset identification is configured to indicate whether the absolute value of the quantized coefficient is greater than 3, wherein the fourth preset identification is configured to indicate whether the absolute value of the quantized coefficient is greater than 4, wherein determining the values of the X preset identifications based on the quantized coefficient comprises:

in response to the absolute value of the quantized coefficient being greater than 1, determining that a value of the first preset identification is the first value; otherwise in response to the absolute value of the quantized coefficient being less than or equal to 1, determining that the value of the first preset identification is a second value;

in response to the absolute value of the quantized coefficient being greater than 2, determining that a value of the second preset identification is the first value; otherwise in response to the absolute value of the quantized coefficient being less than or equal to 2, determining that the value of the second preset identification is the second value;

in response to the absolute value of the quantized coefficient being greater than 3, determining that a value of the third preset identification is the first value; otherwise in response to the absolute value of the quantized coefficient being less than or equal to 3, determining that the value of the third preset identification is the second value; and in response to the absolute value of the quantized coefficient being greater than 4, determining that a value of the fourth preset identification is the first value; otherwise in response to the absolute value of the quantized coefficient being less than or equal to 4, determining that the value of the fourth preset identification is the second value.

15. The method of claim 14, wherein performing entropy coding on the values of the X preset identifications in turn through adaptive binary arithmetic coding using the second context model comprises:

performing entropy coding on the value of the first preset identification, the value of the second preset identification, the value of the third preset identification, and the value of the fourth preset identification in turn through adaptive binary arithmetic coding using the second context model;

or, wherein the second context model comprises a second-first context model and a second-second context model, wherein performing entropy coding on the values of the X preset identifications in turn through adaptive binary arithmetic coding using the second context model comprises:

performing entropy coding on the value of the first preset identification and the value of the second preset identification in turn through adaptive binary arithmetic coding using the second-first context model; and performing entropy coding on the value of the third preset identification and the value of the fourth preset identification in turn through adaptive binary arithmetic coding using the second-second context model.

16. The method of claim 14, wherein determining the remainder of the absolute value of the quantized coefficient and the target order of exponential-Golomb coding in response to the value of the X-th preset identification being the first value comprises:

in response to the value of the fourth preset identification being the first value, determining the remainder of the absolute value of the quantized coefficient and the target order of exponential-Golomb coding to perform entropy coding on the remainder of the absolute value of the quantized coefficient through exponential-Golomb coding of the target order, wherein determining the remainder of the absolute value of the quantized coefficient comprises:

acquiring the remainder of the absolute value of the quantized coefficient by subtracting the value of the significant identification, the value of the first preset identification, the value of the second preset identification, the value of the third preset identification, and the value of the fourth preset identification from the absolute value of the quantized coefficient.

17. The method of claim 11, further comprising:

determining a value of a sign identification based on the quantized coefficient, performing entropy coding on the remainder of the absolute value of the quantized coefficient in a bypass manner, and writing the bit information acquired through coding into the bitstream, wherein determining the value of the sign identification based on the quantized coefficient comprises:

in response to the quantized coefficient being negative, determining that the value of the sign identification is the first value; and in response to the quantized coefficient being positive, determining that the value of the sign identification is a second value.

18. The method of claim 11, further comprising:

determining a coefficient block and a preset order of scan of the coefficient block, wherein the coefficient block comprises at least one quantized coefficient to be coded;

performing entropy coding on the value of the significant identification and the values of the X preset identifications both corresponding to the at least one quantized coefficient in turn according to the preset order of scan; and performing entropy coding on the remainder of the absolute value of the at least one quantized coefficient in turn according to the preset order of scan;

or, the method further comprising:

determining a coefficient block and a preset order of scan of the coefficient block, wherein the coefficient block comprises at least one quantized coefficient to be coded;

performing entropy coding on the value of the significant identification corresponding to the at least one quantized coefficient in turn according to the preset order of scan;

performing entropy coding on the values of the X preset identifications corresponding to the at least one quantized coefficient in turn according to the preset order of scan; and performing entropy coding on a remainder of an absolute value of the at least one quantized coefficient in turn according to the preset order of scan.

19. An encoder, comprising a first memory and a first processor, wherein the first memory is configured to store thereon a computer program executable on the first processor, and the first processor is configured to implement the method of claim 11 when executing the computer program.

20. A decoder, comprising a second communication interface, a second memory and a second processor, wherein the second memory is configured to store thereon a computer program executable on the second processor, the second communication interface is connected to the second processor and the second memory and is configured to receive and send information under control of the second processor, and the second processor is configured to:

acquire a value of a significant identification by decoding a bitstream through adaptive binary arithmetic coding using a first context model based on a quantized coefficient location to be decoded;

in response to the value of the significant identification being a first value, acquire values of X preset identifications by decoding the bitstream through adaptive binary arithmetic coding using a second context model, wherein X is a natural number greater than zero;

in response to a value of an X-th preset identification being the first value, determine a target order of exponential-Golomb coding, and acquire a remainder of a reconstructed quantized coefficient absolute value by decoding the bitstream through exponential-Golomb decoding of the target order, wherein the target order is an integer greater than zero; and determine the reconstructed quantized coefficient absolute value corresponding to the quantized coefficient location based on the value of the significant identification, the values of the X preset identifications, and the remainder of the reconstructed quantized coefficient absolute value.

* * * * *